United States Patent
Ito et al.

(10) Patent No.: US 8,228,661 B2
(45) Date of Patent: Jul. 24, 2012

(54) FILM CAPACITOR AND METHOD OF PRODUCING THE SAME

(75) Inventors: Kaoru Ito, Toyota (JP); Masumi Noguchi, Toyota (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 172 days.

(21) Appl. No.: 12/852,700

(22) Filed: Aug. 9, 2010

(65) Prior Publication Data

US 2011/0032656 A1    Feb. 10, 2011

(30) Foreign Application Priority Data

Aug. 10, 2009  (JP) ................................ 2009-185421
Feb. 3, 2010   (JP) ................................ 2010-021714

(51) Int. Cl.
  *H01G 4/30* (2006.01)
(52) U.S. Cl. ............... 361/301.4; 361/303; 361/305; 361/301.5; 361/312; 361/304
(58) Field of Classification Search ............ 361/301.4, 361/301.5, 303, 304, 305, 311, 312, 301.2, 361/321.1, 306.1
See application file for complete search history.

(56) References Cited

U.S. PATENT DOCUMENTS

| | | | | |
|---|---|---|---|---|
| 5,051,862 A * | 9/1991 | Pageaud et al. | ............... | 361/309 |
| 5,262,920 A * | 11/1993 | Sakuma et al. | ............... | 361/321.5 |
| 5,615,078 A * | 3/1997 | Hudis et al. | ............... | 361/313 |
| 5,844,770 A | 12/1998 | Fries-Carr et al. | | |
| 6,111,743 A * | 8/2000 | Lavene | ............... | 361/301.5 |
| 6,426,861 B1 * | 7/2002 | Munshi | ............... | 361/312 |
| 7,092,233 B2 * | 8/2006 | DeBoer et al. | ............... | 361/303 |
| 8,116,063 B2 * | 2/2012 | Yeh et al. | ............... | 361/303 |
| 8,139,341 B2 * | 3/2012 | Kato et al. | ............... | 361/301.4 |

FOREIGN PATENT DOCUMENTS

| | | |
|---|---|---|
| EP | 0 722 787 A2 | 7/1996 |
| EP | 0 938 971 A2 | 9/1999 |
| EP | 1 400 991 A1 | 3/2004 |
| EP | 2 148 340 A1 | 1/2010 |
| JP | 04-123413 A1 | 4/1992 |
| JP | 06-036967 | 2/1994 |
| JP | 3908094 B2 | 1/2007 |
| JP | 2007-220720 A1 | 8/2007 |
| JP | 2008-091605 A1 | 4/2008 |
| WO | 03/063189 A1 | 7/2003 |

* cited by examiner

*Primary Examiner* — Nguyen T Ha
(74) *Attorney, Agent, or Firm* — Burr & Brown

(57) ABSTRACT

A film capacitor is provided which has a smaller size and improved capacity while securing a sufficient withstand voltage. The film capacitor comprising a basic element 10 containing a plurality of dielectric layers and at least one vapor-deposited metal film layer 14*a*, 14*b*, where the plurality of dielectric layers consisting of a resin film layer 12 and at least one vapor-deposited polymer film layer 16*a*, and the at least one vapor-deposited polymer film layer 16*a* is formed on at least one of the resin film layer 12 and the at least one vapor-deposited metal film layer 14*a*, 14*b*.

15 Claims, 16 Drawing Sheets

FILM CAPACITOR AND METHOD OF PRODUCING THE SAME

The present application is based on Japanese Patent Applications No. 2009-185421 filed on Aug. 10, 2009 and No. 2010-021714 filed on Feb. 3, 2010, the contents of which are incorporated herein by reference.

BACKGROUND OF THE INVENTION

1. Field of the Invention

The present invention relates to a film capacitor. More particularly, the present invention relates to an improvement of a wound film capacitor and a stacked film capacitor.

2. Discussion of Related Art

Conventionally, as one type of film capacitor for use in an electric device, there are known a wound film capacitor and a stacked film capacitor. As disclosed in JP-A-2007-220720, the wound film capacitor is generally produced by winding a multilayer film (metallized film) in which a vapor-deposited metal film (layer) as an electrode film is formed by a vacuum deposition method on one surface of a dielectric (layer) consisting of a resin film (layer) having insulating properties, which is formed of polypropylene and polyethylene terephthalate, for example, or by winding a plurality of basic elements which are stacked on one another. In addition, JP-A-2008-91605 discloses a wound film capacitor that is formed by winding a multilayer film including a dielectric made of a resin film and a vapor-deposited metal film formed on each surface of the dielectric, and another resin film including no vapor-deposited polymer film, while they are stacked with each other. On the other hand, as disclosed in Japanese Patent No. 3908094, for example, the stacked film capacitor is formed by stacking a plurality of above-described multilayer films and the resin film such that the resin film is positioned between the multilayer films. In brief, a wound film capacitor is formed by winding a dielectric (layer) including a resin film (layer) and a vapor-deposited metal film (layer) while they are stacked so as to be positioned alternately, and a stacked film capacitor is formed by stacking a dielectric (layer) including a resin film (layer) and a vapor-deposited metal film (layer) so as to be positioned alternately.

Recently, electric devices have been increasingly demanded to have smaller size and higher performance. Along with this demand, a film capacitor is also increasingly demanded to have smaller size and higher capacity. In the above-described stacked and wound film capacitors, in an effort to meet the demand, it is considered to simultaneously realize downsize of the film capacitor and improvement of capacity thereof, by reducing the thickness of a resin film constituting a dielectric layer to improve the dielectric constant of the resin film.

However, when the thickness of the resin film is reduced, influence of impurities (residue) in the film materials becomes bigger, resulting in deterioration of withstand voltage of the resin film. For that reason, there is a limitation on a reduction in thickness of the resin film. Thus, in the film capacitor having a conventional structure, only by reducing the thickness of the resin film, it was extremely difficult to reduce size thereof and increase capacity thereof (improve performance thereof) to the extent that the demanded requirements are sufficiently fulfilled, while securing high withstand voltage.

To increase the withstand voltage of the resin film, smoothness of the surface may be increased by reducing roughness of a surface of the resin film. The resin film used in the conventional film capacitor is, however, made of a stretched film. Thus, in such a resin film, it was not easy to obtain enough surface smoothness that can sufficiently improve the withstand voltage.

SUMMARY OF THE INVENTION

Therefore, the present invention has been made in the light of the situations described above, and an object of the invention is to provide an improved structure of a film capacitor obtained by winding a basic element or stacking a plurality of basic elements that has a plate shape or sheet shape and includes a dielectric layer having a resin film and a vapor-deposited metal film layer formed on a surface of the dielectric layer, in which the film capacitor is downsized and capacity thereof is improved at a high level while securing a sufficient withstand voltage. It is another object of the invention to provide a method of advantageously producing the film capacitor.

To attain the aforementioned objects, or solve the problems understood from the description throughout the present specification and drawings, the present invention may be preferably embodied according to various aspects which will be described below. Each aspect described below may be employed in any combination. It is to be understood that the aspects and technical features of the present invention are not limited to those described below, and can be recognized based on the inventive concept disclosed in the whole specification and the drawings.

(1) A film capacitor comprising at least one basic element containing a plurality of dielectric layers and at least one vapor-deposited metal film layer, wherein the plurality of dielectric layers consisting of a resin film layer and at least one vapor-deposited polymer film layer, and the at least one vapor-deposited polymer film layer is formed on at least one of the resin film layer and the at least one vapor-deposited metal film layer.

(2) The film capacitor according to the above aspect (1), where the basic element is obtained by forming the at least one vapor-deposited metal film layer on each surface of the resin film layer and further forming the at least one vapor-deposited polymer film layer on at least one of the vapor-deposited metal film layers.

(3) The film capacitor according to the above aspect (2), where a wound element that is obtained by winding the basic element is used to constitute the film capacitor.

(4) The film capacitor according to the above aspect (3), where the wound element is obtained by winding the basic element such that the at least one vapor-deposited polymer film layer is positioned innermost.

(5) The film capacitor according to the above aspect (1) or (2), where the at least one basic element comprises a plurality of basic elements, and the plurality of basic elements are stacked with each other such that a section in which only the resin film layer is positioned between the vapor-deposited metal films and a section in which only the at least one vapor-deposited polymer film is positioned between the vapor-deposited metal films are formed, thereby obtaining a composite element that constitutes the film capacitor.

(6) The film capacitor according to any one of the above aspects (2) to (5), where the vapor-deposited polymer film layer has a thickness in a range of from 0.01 to 30 μm.

(7) The film capacitor according to the above aspect (1), where the basic element is obtained by forming the at least one vapor-deposited polymer film layer on at least one surface of the resin film layer, and further forming the at least one vapor-deposited metal film layer on at least one of the at least one vapor-deposited polymer film layer.

(8) The film capacitor according to the above aspect (7), where the vapor-deposited polymer film layer has a thickness in a range of from 0.001 to 10 µm.

(9) The film capacitor according to the above aspect (7) or (8), where the basic element is obtained by forming the at least one vapor-deposited polymer film layer on each surface of the resin film layer, and forming the at least one vapor-deposited metal film layer on each of the vapor-deposited polymer film layers, and further forming one of another vapor-deposited polymer film layer and another resin film layer as a dielectric layer, on at least one of the vapor-deposited metal film layers.

(10) The film capacitor according to any one of the above aspect (9), where a wound element that is obtained by winding the basic element is used to constitute the film capacitor.

(11) The film capacitor according to the above aspect (10), where the wound element is obtained by winding the basic element such that the at least one vapor-deposited polymer film layer is positioned innermost.

(12) The film capacitor according to any one of the above aspects (7) to (9), comprising a composite element, where the basic element comprises a plurality of basic elements, and the composite element is obtained by stacking the plurality of basic elements such that at least one of the dielectric layers is positioned between the vapor-deposited metal film layers of the adjacent basic elements.

(13) The film capacitor according to any one of the above aspects (1) to (12), where the vapor-deposited polymer film layer is formed of a polyurea resin film.

(14) The film capacitor according to any one of the above aspects (1) to (13), where the vapor-deposited polymer film layer has a three-dimensional cross-linked structure.

(15) The film capacitor according to any one of the above aspects (1) to (14), where a dielectric constant of the at least one vapor-deposited polymer film layer is higher than that of the resin film layer.

(16) The film capacitor according to the above aspect (1), where the at least one vapor-deposited polymer film layer comprises a plurality of vapor-deposited polymer film layers and the at least one vapor-deposited metal film layer comprises a plurality of vapor-deposited metal film layers, and the at least one basic element has a structure in which the plurality of vapor-deposited polymer film layers and the plurality of vapor-deposited metal film layers are alternately formed on the resin film layer.

(17) A method of producing a film capacitor comprising the steps of: providing at least one basic element according to any one of the above aspects (1) to (16); obtaining one of a composite element and a wound element, the composite element obtained by stacking a plurality of basic elements and the wound element obtained by winding the at least one basic element; and producing the film capacitor by using one of the composite element and the wound element.

(18) A method of producing a film capacitor comprising the steps of: providing a plurality of basic elements containing a composite dielectric layer consisting of a resin film layer and at least one vapor-deposited polymer film layer formed on at least one surface of the resin film layer, and a vapor-deposited metal film layer formed on one surface of the composite dielectric layer; and stacking the plurality of basic elements such that the composite dielectric layer and the vapor-deposited metal film layer are alternately positioned.

(19) A method of producing a film capacitor comprising the steps of: providing a plurality of basic elements containing a composite dielectric layer consisting of a resin film layer and at least one vapor-deposited polymer film layer formed on at least one surface of the resin film layer, at least one vapor-deposited metal film layer formed on each surface of the composite dielectric layer, and another vapor-deposited polymer film layer formed on one of the vapor-deposited metal film layers at the side opposite to the composite dielectric layer; and stacking the plurality of basic elements such that the vapor-deposited polymer film layer and the vapor-deposited metal film layer are stacked with each other.

(20) A method of producing a film capacitor comprising the steps of: providing at least one first basic element and at least one second basic element, wherein the at least one first basic element contains a composite dielectric layer consisting of a resin film layer and at least one vapor-deposited polymer film layer formed on at least one surface of the resin film layer, and a vapor-deposited metal film layer formed on one surface of the composite dielectric layer, and the at least one second basic element contains the composite dielectric layer, a vapor-deposited metal film layer formed on each surface of the composite dielectric layer, and another vapor-deposited polymer film layer formed on at least one of the vapor-deposited metal film layers at the side opposite to the composite dielectric layer; and stacking the at least one first basic element and the at least second basic element such that the vapor-deposited polymer film layer and the vapor-deposited metal film layer are stacked with each other.

(21) A method of producing a film capacitor comprising the steps of: providing at least one third basic element and at least one fourth basic element, wherein the at least one third basic element contains a composite dielectric layer consisting of a resin film layer and at least one vapor-deposited polymer film layer formed on at least one surface of the resin film layer, and a vapor-deposited metal film layer formed on each surface of the composite dielectric layer, and the at least one fourth basic element contains the composite dielectric layer, a vapor-deposited metal film layer formed on each surface of the composite dielectric layer, and another vapor-deposited polymer film layer formed on each of the vapor-deposited metal film layers at the side opposite to the composite dielectric layer; and stacking the at least one third basic element and the at least fourth basic element such that another vapor-deposited polymer film layer and the vapor-deposited metal film layer are stacked with each other.

(22) A method of producing a film capacitor comprising a step of: providing a plurality of basic elements, wherein the basic element contains a composite dielectric layer consisting of a resin film layer and at least one vapor-deposited polymer film layer formed on at least one surface of the resin film layer, and a vapor-deposited metal film layer formed on one surface of the composite dielectric layer; and winding the plurality of basic elements while the composite dielectric layer and the vapor-deposited metal film layer are stacked with each other alternately.

(23) A method of producing a film capacitor comprising the steps of: providing a basic element containing a composite dielectric layer consisting of a resin film layer and at least one vapor-deposited polymer film layer formed on at least one surface of the resin film layer, a vapor-deposited metal film layer formed on each surface of the composite dielectric layer, and another vapor-deposited polymer film formed on one of the vapor-deposited metal film layers at the side opposite to the composite dielectric layer; and winding the basic element.

(24) A method of producing a film capacitor comprising the steps of: providing at least one first basic element and at least one second basic element, wherein the at least one first basic element contains a composite dielectric layer consisting of a resin film layer and at least one vapor-deposited polymer film layer formed on at least one surface of the resin film layer, and a vapor-deposited metal film layer formed on one surface of the composite dielectric layer, and the at least one second basic element contains the composite dielectric layer, a vapor-deposited metal film layer formed on each surface of the composite dielectric layer, and another vapor-deposited polymer film layer formed on at least one of the vapor-deposited metal film layers at the side opposite to the composite dielectric layer; and winding the at least one first basic element and the at least second basic element while the vapor-deposited polymer film layer and the vapor-deposited metal film layer are stacked with each other.

(25) A method of producing a film capacitor comprising the steps of: providing at least one third basic element and at least one fourth basic element, wherein the at least one third basic element contains a composite dielectric layer consisting of a resin film layer and at least one vapor-deposited polymer film layer formed on at least one surface of the resin film layer, and a vapor-deposited metal film layer formed on each surface of the composite dielectric layer, and the at least one fourth basic element contains the composite dielectric film layer, a vapor-deposited metal film layer formed on each surface of the composite dielectric layer, and another vapor-deposited polymer film layer formed on each of the vapor-deposited metal film layers at the side opposite to the composite dielectric layer; and winding the at least one third basic element and the at least fourth basic element while the another vapor-deposited polymer film layer and the vapor-deposited metal film layer are stacked with each other.

As described above, the conventional wound film capacitor and the stacked film capacitor have only a structure (A) in which a resin film constituting a dielectric layer is positioned between vapor-deposited metal films. On the other hand, the stacked and wound film capacitors according to the present invention including a vapor-deposited polymer film layer formed on a vapor-deposited metal film layer can have a structure (B), together with the structure (A), in which a vapor-deposited polymer film layer is positioned between vapor-deposited metal film layers. In the structure (B), the thickness of the vapor-deposited polymer film layer can be controlled on a nanoscale, thereby obtaining an extremely smaller thickness and uniform thickness, and impurities in the film is sufficiently reduced. Consequently, at the structure (B), capacitance can be effectively improved and a thickness can be advantageously reduced.

As a result, in the film capacitor of the present invention, the entire capacitor can be downsized and the capacitance thereof can be effectively increased without the steps of extremely reducing the thickness of the resin film layer constituting one of the dielectric layers and reducing impurities in the film material.

In addition, the film capacitor of the present invention is free from a problem of deterioration of the withstand voltage caused by the influence of impurities in material of the resin film layer, because the thickness of the resin film layer is not excessively reduced. Further, when the vapor-deposited metal film layer is continuously formed on the resin film layer by metal deposition, the occurrence of wrinkles on the resin film layer by high-speed winding can be prevented. Furthermore, the resin film layer may not be thermally affected, when metal atoms having high-temperatures are attached to the resin film layer in the metal deposition process.

In the stacked and wound film capacitors of the present invention, even if the vapor-deposited polymer film layer is formed on the resin film layer, which is one of the dielectric layers, the thickness of the vapor-deposited polymer film layer and impurities in the film are sufficiently reduced. As a result, both of dielectric constant and withstand voltage of the vapor-deposited polymer film layer are sufficiently improved. In addition, the vapor-deposited polymer film layer has a uniform thickness, so that the surface smoothness is sufficiently improved.

Thus, in the film capacitor of the present invention, even if the thickness of the resin film layer is reduced, the resin film layer can have a high dielectric constant and a high withstand voltage in the dielectric layer due to the presence of the vapor-deposited polymer film layer formed on the resin film layer.

Further, even if the resin film layer is made of a stretched film, surface smoothness of the resin film layer can be readily and effectively improved, thereby advantageously improving the withstand voltage of the dielectric layer.

Accordingly, both of the stacked and wound film capacitors of the present invention can be downsized and can have higher capacity while securing a sufficient voltage. As a result, the recent requirements that demand a film capacitor to have a smaller size and an improved performance can be fulfilled at a high level.

Further, according to a method of producing the film capacitor of the present invention, there can be advantageously produced either of the stacked film capacitor and the wound film capacitor that has a smaller, size and a higher capacity while securing the sufficient withstand voltage.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE INVENTION

To further clarify the present invention, there will be described in detail embodiments of the present invention with reference to the accompanying drawings.

Figure 1:
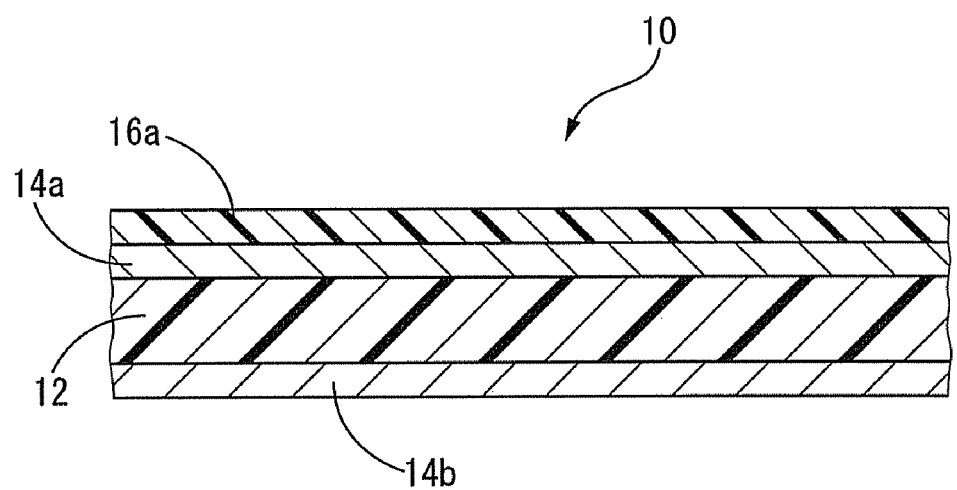
FIG. 1 is a partially enlarged cross sectional view showing one example of a multilayer film constituting a basic element, which is a component of a film capacitor having a structure according to the present invention.

Initially, FIG. 1 shows an example of a multilayer film constituting a basic element, which is a component of a film capacitor according to the present invention, in a state in which the multilayer film is not wound. As apparent from FIG. 1, a multilayer film 10 having a sheet shape includes a resin film 12 as a dielectric, which constitutes one dielectric layer of a multilayer structure. Here, the resin film 12 is formed of a stretched film made of polypropylene and has a thickness of about 1 to 10 μm. However, the material of the resin film 12 is not particularly limited to polypropylene. Instead of polypropylene, resin materials such as polyethylene terephthalate, polyphenylene sulfide, polyethylene naphtalate and the like, which are used as materials of resin films of conventional film capacitors, can be suitably employed.

On one surface of the resin film 12 (an upper surface of the resin film 12 in FIG. 1) and on the other surface of the resin film 12 (an under surface of the resin film 12 in FIG. 1), a first vapor-deposited metal film 14a and a second vapor-deposited metal film 14b are formed to constitute a layer, respectively. Each of the first vapor-deposited metal film 14a and the second vapor-deposited metal film 14b constitutes one layer. The first and second vapor-deposited metal films 14a, 14b function as internal electrode films. The first and second vapor-deposited metal films 14a, 14b are formed on the resin film 12 by a vacuum deposition method using a conventional metallic material as a deposition material, which forms an internal electrode film of a film capacitor. Membrane resistance of each of the vapor-deposited metal films 14a, 14b is set at about 1 to 50 $\Omega/cm^2$ and a thickness thereof is suitably determined depending on the membrane resistance, for example.

Material of the vapor-deposited metal films 14a, 14b is suitably selected from metallic materials such as aluminum and zinc depending on the material of the resin film 12, for example. Each of the first and second vapor-deposited metal films 14a, 14b is formed by any conventionally known vacuum deposition methods that are in the same category as PVD and CVD. The first vapor-deposited metal film 14a and the second vapor-deposited metal film 14b may be formed of different metallic materials. The materials are determined depending on the required performance for the film capacitor, for example. In addition, the thickness and membrane resistance of each of the first vapor-deposited metal film 14a and the second vapor-deposited metal film 14b may be the same or different depending on the required performance or the like of the film capacitor.

Especially, in this embodiment, a first vapor-deposited polymer film 16a, which functions as a dielectric, is formed on a surface of the first vapor-deposited metal film 14a at the side opposite to the resin film 12 to constitute another dielectric layer. The first vapor-deposited polymer film 16a is formed of a polyurea resin film produced by a conventionally known vacuum deposition polymerization. Specifically, in the production of the first vapor-deposited polymer film 16a, the resin film 12 on which the first vapor-deposited metal film 14a and the second vapor-deposited metal film 14b are formed is located in a vacuum chamber in which the pressure therein is controlled to be in a range of about $10^{-5}$ to 100 Pa. Then, in the vacuum chamber, diisocyanate and diamine, which are raw materials, are evaporated and polymerization reaction is caused on the first vapor-deposited metal film 14a. As a result, a polyurea resin is generated and the first vapor-deposited polymer film 16a is formed on the first vapor-deposited metal film 14a by the generated polyurea resin.

As described above, the first vapor-deposited polymer film 16a is formed of a polymer generated by a vacuum deposition polymerization in which a film is formed by using the polymer generated by polymerizing a raw material (monomer) that is supplied in a gaseous state and forms a polymer which is to be a dielectric. Consequently, the thickness of the first vapor-deposited polymer film 16a can be controlled on a nanoscale, and the thickness thereof is controlled so as to be extremely small and uniform. Further, impurities in the film are sufficiently reduced. The thickness of the first vapor-deposited polymer film 16a is generally within a range of from about 0.01 to 30 μm, which is thinner than the resin film 12. If the thickness of the first vapor-deposited polymer film 16a is less than 0.01 μm, it may be too thin to secure the sufficient withstand voltage properties. On the other hand, if the thickness of the first vapor-deposited polymer film 16a exceeds 30 μm, it may be difficult to downsize the film capacitor.

The first vapor-deposited polymer film 16a is not limited to the exemplified polyurea resin film. Any known resin film that can form a film by a deposition polymerization may be employed. Examples of the resin films include polyamide resin film, polyimide resin film, polyamideimide resin film, polyester resin film, polyazomethine resin film, polyurethane resin film, and acrylic resin film. Among the above listed resin films, one having a higher dielectric constant than that of the resin film 12 is favorably employed. Due to the formation of the first vapor-deposited polymer film 16a by using such a resin film, the capacitance of the film capacitor can be effectively increased. The resin materials of the resin film 12 and the first vapor-deposited polymer film 16a, which have different dielectric constants, are not limited to the combination of the polypropylene and the polyurea described above.

Of the above-described resin films having high dielectric constant, the polyurea resin film is favorably used to form the first vapor-deposited polymer film 16a. This is because that the polyurea resin dose not require the heat treatment in the polymerization of raw monomers (diisocyanate and diamine) and is formed in the addition polymerization reaction that is completely free from elimination of water, alcohol and the like. Consequently, equipments (facilities) for the heat treatment in the polymerization of monomers is not necessary and cost can be reduced. Further, deformation of the resin film 12 by the heat during the heat treatment can be effectively avoided. Furthermore, there is no need to remove water, alcohol and the like, which are eliminated by the polymerization reaction, from the vacuum chamber in which the polymerization reaction proceeds. Therefore, equipments for the removal is not necessary and cost can be reduced. In addition, the polyurea resin film has an excellent moisture resistance, thereby stably securing a high withstand voltage of the first vapor-deposited polymer film 16a.

In this embodiment, on a surface of the first vapor-deposited polymer film 16a which is formed on the first vapor-deposited metal film 14a, a plasma treatment is further performed to introduce a three-dimensional cross-linked structure to the first vapor-deposited polymer film 16a. By this treatment, the withstand voltage of the first vapor-deposited polymer film 16a is advantageously improved. Any known process of the plasma treatment for a surface of the first vapor-deposited polymer film 16a can be employed. For example, a process in which plasma generated by using a laser is irradiated on the surface of the first vapor-deposited polymer film 16a can be employed. As an introduction method of the three-dimensional cross-linked structure to the first vapor-deposited polymer film 16a, other than the plasma treatment, a UV treatment, a thermal treatment and other treatments to the first vapor-deposited polymer film 16a can be suitably employed.

Thus, the multilayer film 10 shown in FIG. 1 is obtained, which has a laminated structure in which the first and second vapor-deposited metal films 14a, 14b are formed on each surface of the resin film 12 and the first vapor-deposited polymer film 16a is formed on the first vapor-deposited metal film 14a.

Figure 2:
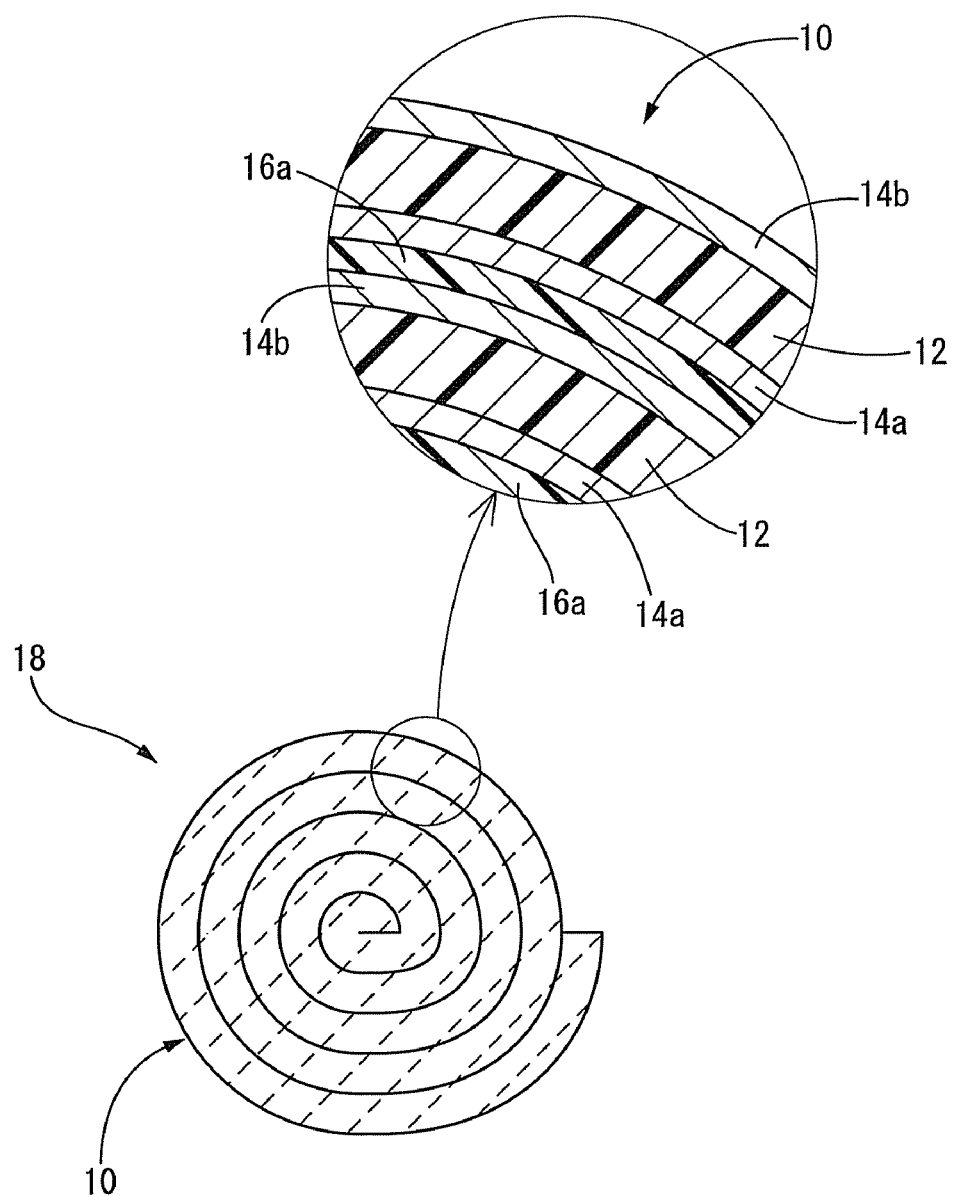
FIG. 2 is a cross sectional view showing a wound element formed by winding the multilayer film shown in FIG. 1.
Figure 17:
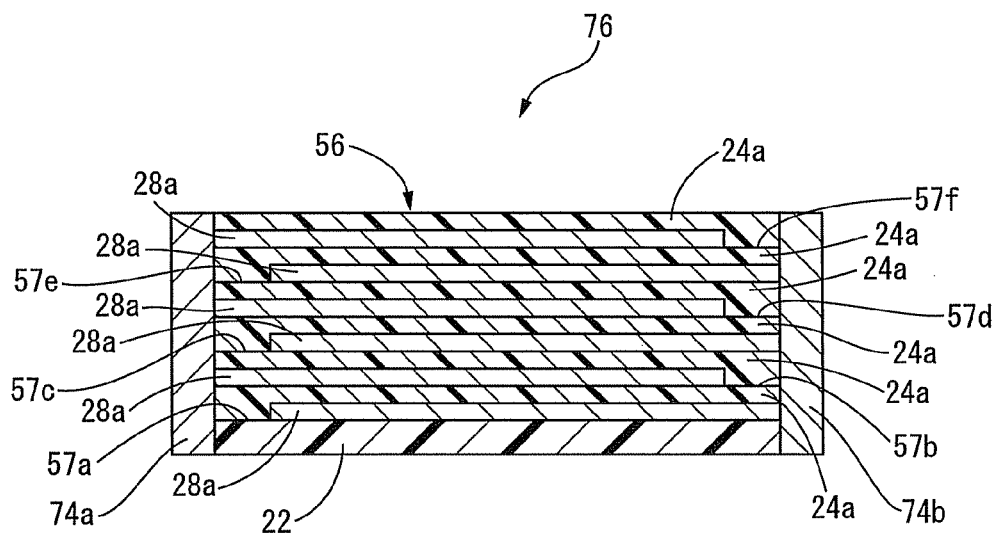
FIG. 17 is a cross sectional view showing a film capacitor having a structure according to the present invention, which is obtained by using the multilayer film shown in FIG. 15.

Then, as shown in FIG. 2, a wound element (capacitor element) 18 is formed by winding the multilayer film 10 a plurality of times such that the first vapor-deposited polymer film 16a is positioned innermost, or winding the multilayer film 10 on a predetermined core (not shown) one or plurality of times such that the first vapor-deposited polymer film 16a is positioned innermost. Thereafter, although not shown in the drawings, a protective film and the like, which are used in the conventional film capacitor, are wound over an outer circumferential surface of the wound element 18 and external electrodes (74a, 74b) such as a pair of electrodes prepared by a metal spraying process, which is shown in FIG. 17, is attached thereto, thereby obtaining the intended wound film capacitor.

The wound element 18 may be obtained by winding a laminated structure body having a plate shape or a sheet shape, which is obtained by stacking a plurality of multilayer films 10 with each other. Although not shown in the drawings, a wound element 18 may also be obtained by winding a laminated structure body having a plate shape or sheet shape, which is obtained by stacking a multilayer film including the resin film 12 and only the first vapor-deposited metal film 14a formed on one surface of the resin film 12, and the multilayer film 10 shown in FIG. 1 with each other such that the first vapor-deposited metal film 14a of the former and the first vapor-deposited polymer film 16a of the latter is stacked with each other. In this case, one of the multilayer films stacked with each other does not include the first vapor-deposited polymer film 16a that requires time and cost for the production thereof, so that the efficiency of the production of the wound element 18 can be improved and the cost thereof can be lowered.

As apparent from FIG. 2, in the wound element 18 formed by a roll of the multilayer film 10, the first vapor-deposited polymer film 16a, the first vapor-deposited metal film 14a, the resin film 12, and the second vapor-deposited metal film 14b are stacked radially outwardly in the order of the description, and when the above-described stacked form is counted as one unit, a plurality of units are further stacked in a radial direction. By this arrangement, the structure (A) and the structure (B) are realized. In the structure (A), the resin film 12 is positioned between the first and second vapor-deposited metal films 14a, 14b, where the first vapor-deposited metal film 14a is positioned inwardly and the second vapor-deposited metal film 14b is positioned outwardly. In the structure (B), the first vapor-deposited polymer film 16a is positioned between the first and second vapor-deposited metal films 14a, 14b, where the second vapor-deposited metal film 14b is positioned inwardly and the first vapor-deposited metal film 14a is positioned outwardly. In other words, the wound element 18 is formed by stacking the first vapor-deposited metal film 14a and the second vapor-deposited metal film 14b so as to have the resin film 12 or the first vapor-deposited polymer film 16a therebetween.

Accordingly, unlike the conventional wound film capacitor, the film capacitor having the wound element 18 of this embodiment has not only the structure (A) in which the resin film 12 is positioned between the first and second vapor-deposited metal films 14a, 14b, but also the structure (B) in which the first vapor-deposited polymer film 16a having an extremely small and uniform thickness and extremely few impurities in the film is positioned between the first and second vapor-deposited metal films 14a, 14b.

Thus, unlike the conventional wound film capacitors that have only the structure (A) in which the resin film 12 is positioned between the first and second vapor-deposited metal films 14a, 14b, the film capacitor having the wound element 18 of this embodiment can have a smaller size, and the capacitance thereof can be increased without extremely reducing the thickness of the resin film 12 and reducing the impurities in the material of the resin film 12, due to the presence of the structure (B).

In this film capacitor, deterioration of the withstand voltage of the resin film 12, eventually of the entire capacitor, caused by the impurities which are inevitably present in the resin film 12 can be avoided, because the resin film 12 has a thickness that is not extremely reduced. As a result, sufficient withstand voltage can be advantageously secured. In addition, in the continuous formation of the first and second vapor-deposited metal films 14a, 14b on each surface of the resin film 12 by metal deposition, deteriorations in the quality of the film capacitor can be advantageously prevented, which are caused by the wrinkles occurred on the resin film 12 due to a high-speed winding or caused by the deformation of the resin film 12 by contact of the metal atoms having high temperatures, for example.

Thus, the film capacitor having the wound element 18 of this embodiment can advantageously have a higher-performance by reducing the size thereof and improving the capacity thereof, without improving the functionality of the resin film 12 by reducing the thickness of the resin film 12, without reducing the impurities in the resin film 12, and without causing the problems which will be caused by reducing the thickness of the resin film 12.

The film capacitor having the wound element 18 of this embodiment includes the first vapor-deposited polymer film 16a that is formed of the polyurea resin film, so that in the formation of the first vapor-deposited polymer film 16a by deposition polymerization, extra equipments can be eliminated to the maximum extent possible and cost of the equipments can be advantageously reduced. Further, harmful effects caused by heating the resin film 12 can be effectively avoided, thereby advantageously securing the stable quality of the film capacitor.

In this embodiment, the first vapor-deposited polymer film 16a has the three-dimensional cross-linked structure, so that the withstand voltage of the first vapor-deposited polymer film 16a is improved. Accordingly, improvement and stabilization of the quality can be effectively obtained by this, too.

In the film capacitor having the wound element 18 of this embodiment, the first vapor-deposited polymer film 16a has an extremely reduced thickness and a higher dielectric constant than that of the resin film 12. Accordingly, the capacitance of the entire film capacitor is effectively increased, and quality thereof is improved.

Although, in the above embodiment, the first vapor-deposited polymer film 16a is formed only on the surface of the first vapor-deposited metal film 14a at the side opposite to the resin film 12, instead of the first vapor-deposited metal film 14a, the first vapor-deposited polymer film 16a may be formed only on a surface of the second vapor-deposited metal film 14b at the side opposite to the resin film 12.

Figure 3:
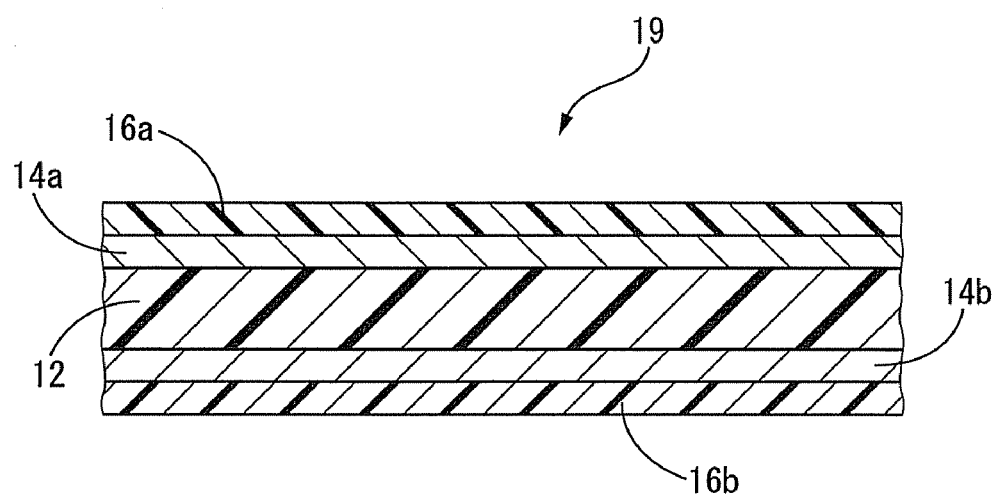
FIG. 3 is a view showing another example of a multilayer film constituting a basic element, which is a component of a film capacitor having a structure according to the present invention, and corresponding to FIG. 1.

Further, as shown in FIG. 3, a multilayer film 19, which is a basic element, may be constituted by forming the first vapor-deposited polymer film 16a on a surface of the first vapor-deposited metal film 14a at the side opposite to the resin film 12 and a second vapor-deposited polymer film 16b on a surface of the second vapor-deposited metal film 14b at the side opposite to the resin film 12. In the production of the wound element 18 by winding the multilayer film 19 having the above structure, either surface of the resin film 12 can be positioned inside so as to constitute the center portion of the wound element 18 by the first vapor-deposited polymer film 16a or the second vapor-deposited polymer film 16b. As a result, the wound element 18, eventually the film capacitor, having the excellent quality in which capacitance is effectively increased, can be advantageously obtained.

When the wound element 18 is produced by winding the multilayer film 19, the first vapor-deposited polymer film 16a and the second vapor-deposited polymer film 16b are positioned, while being stacked with each other, between the first vapor-deposited metal film 14a and the second vapor-deposited metal film 14b. Accordingly, it is preferable that the thickness of each of the first and second vapor-deposited polymer films 16a, 16b is about half the thickness of the first vapor-deposited polymer film 16a included in the multilayer film 10 shown in FIG. 1. Due to this, the total thickness of the first and second vapor-deposited polymer films 16a, 16b positioned between the first and second vapor-deposited metal films 14a, 14b of the wound element 18 obtained by winding the multilayer film 19 becomes substantially equal to the thickness of the first vapor-deposited polymer film 16a positioned between the first and second vapor-deposited metal films 14a, 14b of the wound element 18 obtained by winding the multilayer film 10, thereby preventing the size of the wound element 18 from being bigger than is necessary. In addition, by making the thickness of each of the first and second vapor-deposited polymer films 16a, 16b thinner, the production of the multilayer film 19 can be expedited.

The number of winding of the multilayer film 10 or 19 to obtain the wound element 18 is not limited. For example, when the multilayer film 10 or 19 is wound such that the first vapor-deposited polymer film 16a or the second vapor-deposited polymer film 16b is positioned innermost, the number of winding the multilayer film 10, 19 may be one, because the center portion of the wound element 18 is constituted by either of the first vapor-deposited polymer film 16a and the second vapor-deposited polymer film 16b.

Further, the wound element 18 may be produced by winding a laminated structure body having a plate shape or sheet shape, which is obtained by stacking at least one multilayer film 10 having a structure shown in FIG. 1 and at least one multilayer film 19 having a structure shown in FIG. 3. In this case, the first vapor-deposited polymer film 16a formed on the first vapor-deposited metal film 14a of the multilayer film 10 is stacked with one of the first and second vapor-deposited polymer films 16a, 16b formed on the first and second vapor-deposited metal films 14a, 14b of the multilayer film 19. Accordingly, thickness of the first vapor-deposited polymer film 16a of the multilayer film 10 and thickness of one of the first and second vapor-deposited polymer films 16a, 16b of the multilayer film 19, which is stacked with the first vapor-deposited polymer film 16a of the multilayer film 10 is made half the thickness of one of the first and second vapor-deposited polymer films 16a, 16b of the multilayer film 19, which is not stacked with the first vapor-deposited polymer film 16a of the multilayer film 10, for example. Accordingly, it can be prevented that the first and second vapor-deposited polymer films 16a, 16b, which are stacked with each other, becomes thicker than is necessary. In addition, by making each of the first and second vapor-deposited polymer films 16a, 16b, which are stacked with each other, thinner, the production of the multilayer film 10 and the multilayer film 19, which are stacked with each other, can be expedited.

Figure 4:
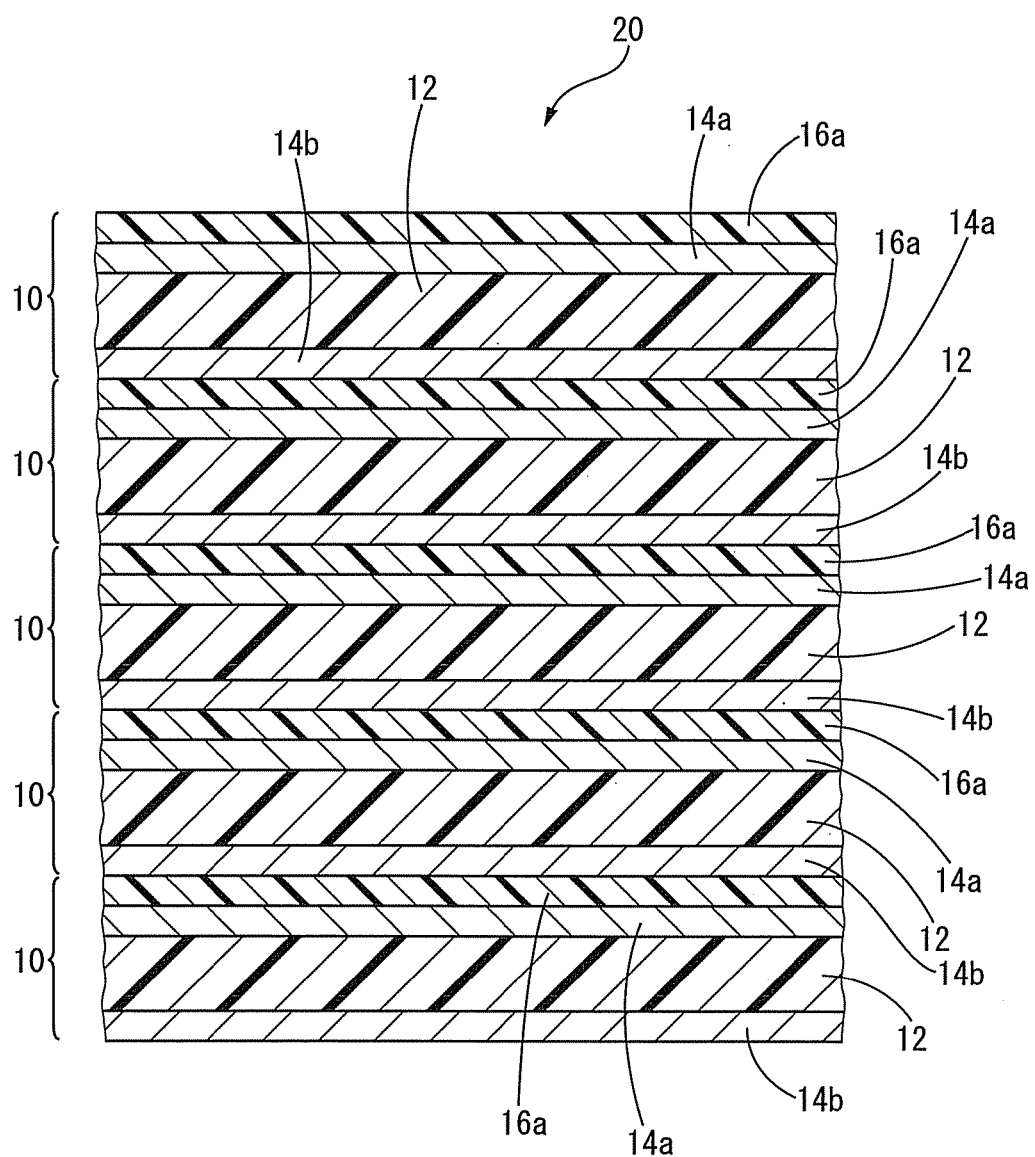
FIG. 4 is a partially enlarged cross sectional view showing a composite element formed of a plurality of multilayer films shown in FIG. 1.

Furthermore, when the multilayer film 10 having the structure shown in FIG. 1 is used, a stacked composite element 20 having a plate shape or block shape (capacitor element) can be obtained by stacking a plurality of multilayer films 10 (here, five multilayer films), as shown in FIG. 4. The stacked composite element 20 also has not only structure (A) in which only the resin film 12 is positioned between the first and second vapor-deposited metal films 14a, 14b, but also the structure (B) in which only the first vapor-deposited polymer film 16a having an extremely small and uniform thickness and extremely few impurities in the film is positioned between the first and second vapor-deposited metal films 14a, 14b. Accordingly, the stacked composite element 20 can advantageously obtain substantially the same advantages as those of the wound element 18 of the above-described embodiment.

In the production of the above stacked composite element 20, it is favorable to stack a plurality of multilayer films 10 such that the first vapor-deposited polymer film 16a of one multilayer film 10 is stacked with the second vapor-deposited metal film 14b of another multilayer film 10. By this arrangement, in the composite element 20, one of the first vapor-deposited polymer film 16a and the resin film 12 is always positioned between the first vapor-deposited metal film 14a and the second vapor-deposited metal film 14b. As a result, the stacked composite element 20, eventually the entire film capacitor having the stacked composite element 20, can advantageously and effectively be made smaller and have increased capacitance.

Although not shown in the drawings, the composite element may be formed by stacking a plurality of multilayer films 19 having a structure shown in FIG. 3. In this case, the outermost layers of the multilayer film 19 in a thickness direction are constituted by the first vapor-deposited polymer film 16*a* and the second vapor-deposited polymer film 16*b*. Therefore, when the multilayer films 19 are stacked, the multilayer films 19 can be stacked without determining which surface should be stacked. As a result, the production of the composite element having a plate shape or block shape, eventually of the film capacitor becomes easier. Further, a composite element having a flat shape or a sheet shape may be formed by stacking at least one multilayer film 10 shown in FIG. 1 and at least one multilayer film 19 shown in FIG. 3 with each other. When the composite element is produced by stacking a plurality of the multilayer films 19 shown in FIG. 3 or stacking the multilayer film 19 shown in FIG. 3 and the multilayer film 10 shown in FIG. 1, like the production of the wound element 18, it is preferable that the thickness of each of the first and second vapor-deposited polymer films 16*a*, 16*b* is about half the thickness of the first vapor-deposited polymer film 16*a* included in the composite element consisting of a plurality of multilayer films 10.

Figure 5:
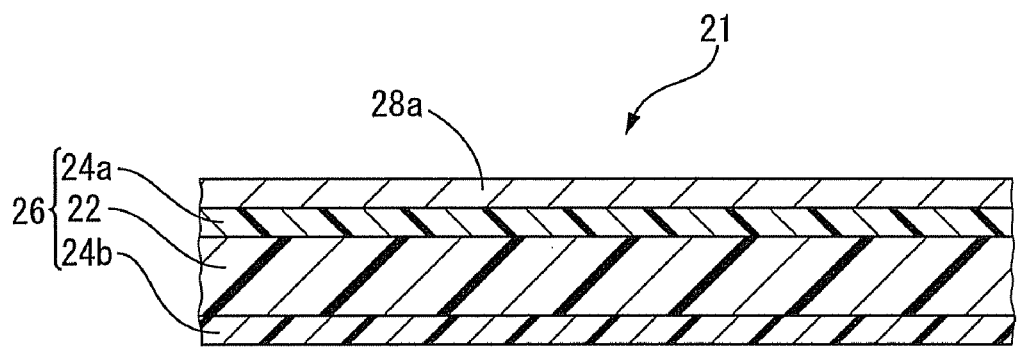
FIG. 5 is a partially enlarged cross sectional view showing another example of a multilayer film constituting a basic element, which is a component of a film capacitor having a structure according to the present invention.

Then, FIG. 5 shows another example of a multilayer film, which is a basic element, which constitutes a film capacitor according to the present invention, in a vertical cross section. In FIG. 5, reference number 21 denotes a multilayer film having a sheet shape (first basic element) which includes a resin film 22 as a base. The resin film 22 is formed of a stretched film made of polypropylene and has a thickness of about 1 to 10 μm, which has an adequate thin thickness. However, the formation material of the resin film 22 is not limited to polypropylene. Any materials listed above as formation materials of the resin film 12 of the multilayer film 10 shown in FIG. 1 can be used.

On one surface of the resin film 22 (an upper surface of the resin film 22 in FIG. 5), a first vapor-deposited polymer film 24*a* is formed by a deposition polymerization, and on the other surface of the resin film 22 (an under surface of the resin film 22 in FIG. 5), a second vapor-deposited polymer film 24*b* is also formed by a deposition polymerization. Accordingly, a composite dielectric 26 is formed as a laminated structure body including the resin film 22, the first and second vapor-deposited polymer films 24*a* and 24*b*.

The first and second vapor-deposited polymer films 24*a*, 24*b* are formed on respective surfaces of the resin film 22 in the same manner as in the formation of the first vapor-deposited polymer film 16*a* on the first vapor-deposited metal film 14*a* of the multilayer film 10 shown in FIG. 1. Specifically, the first and second vapor-deposited polymer films 24*a*, 24*b* are formed by a vacuum deposition polymerization where the thickness of the films can be controlled on a nanoscale. Thus, the thickness of each of the first and second vapor-deposited polymer films 24*a*, 24*b* is controlled so as to be extremely small, and impurities in the films are sufficiently reduced to the maximum extent possible. As a result, the dielectric constant and the withstand voltage of the first and second vapor-deposited polymer films 24*a*, 24*b* are sufficiently improved.

Further, the thickness of the first and second vapor-deposited polymer films 24*a*, 24*b* formed by a vacuum deposition polymerization is controlled to be uniform. Thus, the surface smoothness of the first and second vapor-deposited polymer films 24*a*, 24*b* is effectively improved. In addition, the surface smoothness of the resin film 22 is advantageously improved, because the surfaces of the resin film 22 are formed by the first vapor-deposited polymer film 24*a* and the second vapor-deposited polymer film 24*b*. As a result, even if the resin film 22 has a thickness of about 1 to 10 μm which is relatively small, the resin film 22 effectively secures a high withstand voltage.

Accordingly, the composite dielectric 26 formed of the laminated body including the resin film 22, the first and second vapor-deposited polymer films 24*a*, 24*b* can advantageously obtain both of the high dielectric constant and the high withstand voltage.

In this embodiment, each of the first and second vapor-deposited polymer films 24*a*, 24*b* is formed of a polyurea resin film. However, the formation material of the first and second vapor-deposited polymer films 24*a*, 24*b* is not limited to the polyurea resin film. The first and second vapor-deposited polymer films 24*a*, 24*b* may be formed of any resin films that are listed above as resin films that can constitute the first vapor-deposited polymer film 16*a*. Among the resin films listed above, especially, the polyurea resin film is favorably employed as a resin film that constitutes the first and second vapor-deposited polymer films 24*a*, 24*b*, from the reason described above, for example.

It is preferable that the thickness of each of the first and second vapor-deposited polymer films 24*a*, 24*b* is about 0.001 to 10 μm. It is difficult to make the thickness of the first and second vapor-deposited polymer films 24*a*, 24*b* less than 0.001 μm, so that the thickness of the first and second vapor-deposited polymer films 24*a*, 24*b* practically becomes 0.001 μm or more. Further, even if the thickness of the first and second vapor-deposited polymer films 24*a*, 24*b* is made to be more than 10 μm, which is beyond the upper limit of the favorable thickness of the resin film 22, the improvement of the surface smoothness of the resin film 22 obtained by the formation of the first and second vapor-deposited polymer films 24*a*, 24*b* cannot be enhanced. In fact, the productivity of the first and second vapor-deposited polymer films 24*a*, 24*b* may be deteriorated and the cost for producing them may be increased.

On a surface of the first and second vapor-deposited polymer films 24*a*, 24*b*, a plasma treatment is performed, thereby introducing the three-dimensional cross-linked structure to the first and second vapor-deposited polymer films 24*a*, 24*b*. By this treatment, the withstand voltage and heat resistance of the first and second vapor-deposited polymer films 24*a*, 24*b* are advantageously improved. Any known process of the plasma treatment can be employed as the plasma treatment for a surface of the first and second vapor-deposited polymer films 24*a*, 24*b*. As an introduction method of the three-dimensional cross-linked structure to the first and second vapor-deposited polymer films 24*a*, 24*b*, other than the plasma treatment, a UV treatment, a thermal treatment and other treatments to the first and second vapor-deposited polymer films 24*a*, 24*b* can be suitably employed.

A first vapor-deposited metal film 28*a* as an electrode film is formed on a surface of the first vapor-deposited polymer film 24*a* at the side opposite to the resin film 22. Like the first and second vapor-deposited metal films 14*a*, 14*b* of the multilayer film 10 shown in FIG. 1, the first vapor-deposited metal film 28*a* is formed on the first vapor-deposited polymer film 24*a* by a vacuum deposition method using a conventionally known metallic material (for example, aluminum or zinc) for a electrode film of a film capacitor as a deposition material. The first vapor-deposited metal film 28*a* is made to have the same membrane resistance as the first and second vapor-deposited metal films 14*a*, 14*b*. The thickness of the first vapor-deposited metal film 18*a* is suitably determined depending on the membrane resistance and the like.

Thus, the multilayer film 21 having a structure as shown in FIG. 5 is obtained by further forming the first vapor-deposited metal film 28*a* on the first vapor-deposited polymer film 24*a* of the composite dielectric 26 including the resin film 22 and the first and second vapor-deposited polymer films 24a, 24b formed on each surface of the resin film 22.

In the production of the film capacitor by using a basic element consisting of the multilayer film 21, first, a plurality of multilayer films 21 are stacked on one another to form a laminated structure body having a plate shape or sheet shape. At this time, the first vapor-deposited metal film 28a of one of the multilayer films 21 is stacked on the second vapor-deposited polymer film 24b of the other multilayer film 21 to be stacked. The number of multilayer films 21 to be stacked is not particularly limited.

Figure 6:
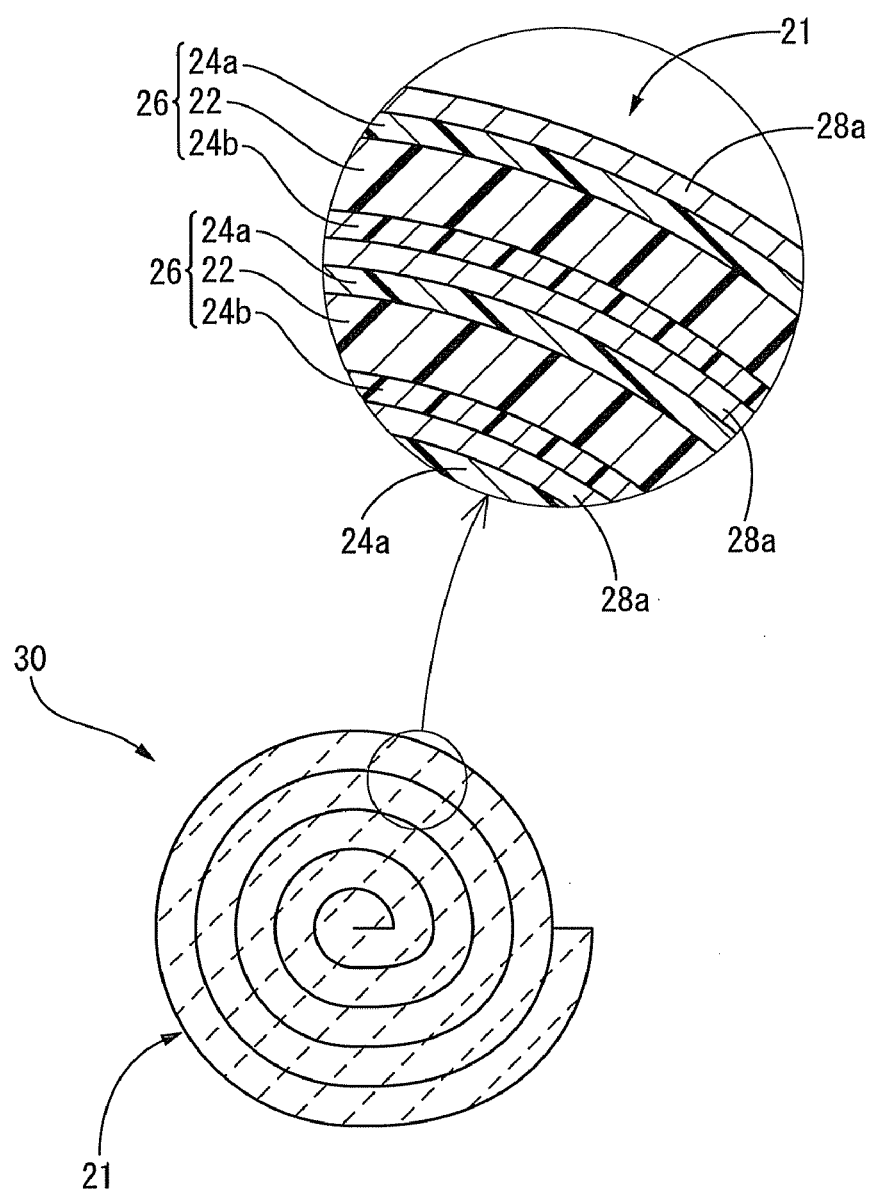
FIG. 6 is a cross sectional view showing a wound element formed by winding the multilayer film shown in FIG. 5.

Then, as shown in FIG. 6, a laminated structure body consisting of a plurality of multilayer films 21 is wound such that the second vapor-deposited polymer film 24b is positioned innermost, for example. Alternatively, the laminated structure body is wound around a prescribed core (not shown) once or a plurality of times, such that the second vapor-deposited polymer film 24b is positioned innermost. As a result, a wound element 30 is obtained. In the wound element 30, the composite dielectric 26 and the first vapor-deposited metal film 28a are stacked with each other so as to be arranged alternately. Although not shown in the drawings, a wound element 30 may be obtained by winding a laminated structure body, which is obtained by stacking a multilayer film including the resin film 22 and only the first vapor-deposited metal film 28a formed on one surface of the resin film 22, and the multilayer film 21 shown in FIG. 5 with each other such that the first vapor-deposited metal film 28a of the former and the second vapor-deposited polymer film 24b of the latter is stacked with each other.

Thereafter, although not shown in the drawings, a protective film or the like, which is used in the conventional film capacitor, is wound over an outer circumferential surface of the wound element 30 and external electrodes such as a pair of electrodes prepared by a metal spraying process, a predetermined terminal, or the like is attached thereto, thereby obtaining the intended wound film capacitor.

As described above, in the film capacitor of this embodiment, the entire size of the film capacitor is advantageously reduced by making the thickness of the resin film 22 smaller. Further, the composite dielectric 26 is advantageously made to have both of the high dielectric constant and the high withstand voltage by forming the first and second vapor-deposited polymer films 24a, 24b on each surface of the resin film 22. Therefore, the film capacitor of this embodiment is effectively downsized and made to have a higher capacity (high performance) while securing a sufficient withstand voltage.

Figure 7:
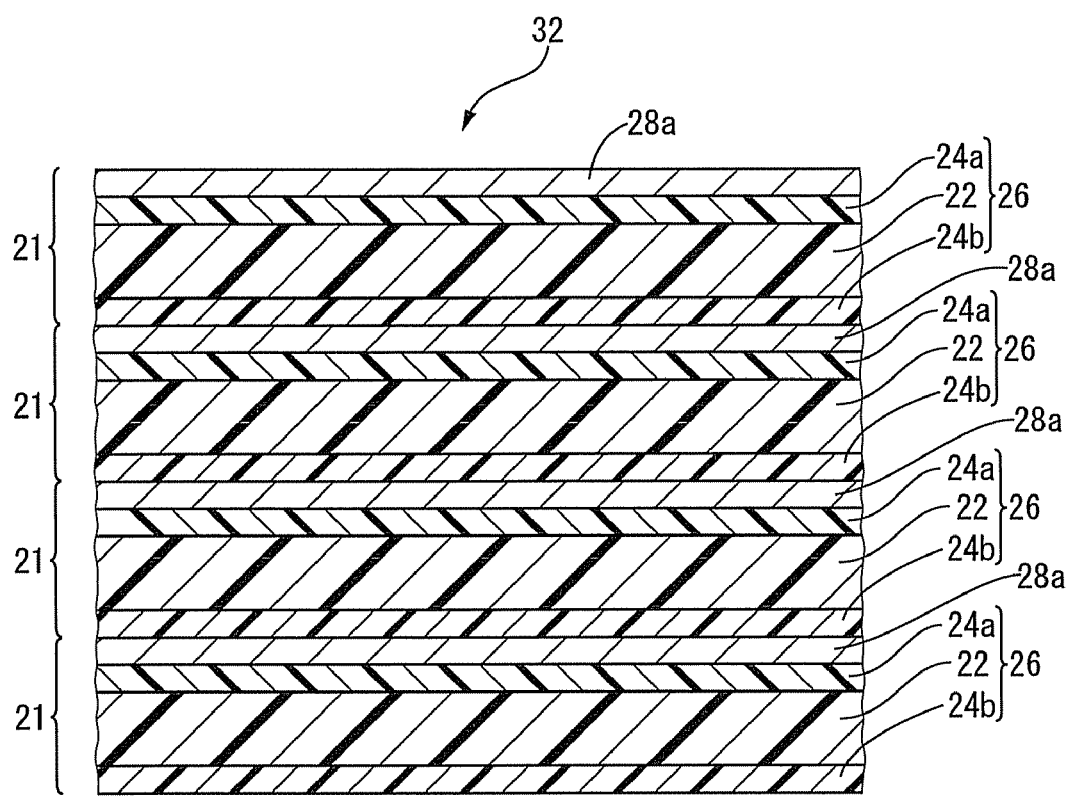
FIG. 7 is a partially enlarged cross sectional view showing a composite element formed of a plurality of multilayer films shown in FIG. 5.

When the multilayer film 21 having a structure shown in FIG. 5 is used, a plurality of multilayer films 21 (here, four) are stacked such that the composite dielectric 26 and the first vapor-deposited metal film 28a are arranged alternately as shown in FIG. 7, thereby obtaining a stacked composite element 32. The stacked composite element 32 also includes the composite dielectric 26 having the resin film 22, which has an adequate thin thickness, and the first and second vapor-deposited polymer films 24a, 24b formed on each surface of the resin film 22. Accordingly, the stacked film capacitor obtained by attaching a protective film, external electrodes such as a pair of electrodes prepared by a metal spraying process, a predetermined terminal or the like to the composite element 32 can have substantially the same advantages as the wound film capacitors of the above-described embodiments. With respect to the embodiments shown in FIG. 7, FIGS. 8 to 15, and FIGS. 17 to 20, which will be described later, the same reference numerals as used in FIG. 5 and FIG. 6 are used for members and portions having the same structures as those of the above-mentioned embodiments, and a detailed explanation of which is dispensed with.

In both of the above-described wound and stacked film capacitors, the composite dielectric 26 is obtained by forming the first vapor-deposited polymer film 24a and the second vapor-deposited polymer film 24b on each surface of the resin film 22. The composite dielectric 26, however, may be obtained by forming the vapor-deposited polymer film (the first vapor-deposited polymer film 24a or the second vapor-deposited polymer film 24b) on only one surface of the resin film 22. When the multilayer film 21 as a basic element is constituted by the composite dielectric 26 in which the vapor-deposited polymer film is formed on only one surface of the resin film 22, the vapor-deposited metal film(s) (both of the first vapor-deposited metal film 28a and the second vapor-deposited metal film 28b or either one of them) is/are formed on both of a surface of the resin film 22, on which the vapor-deposited polymer film is not formed, and the vapor-deposited polymer film, or on either one of them (preferably, on the vapor-deposited polymer film). It is preferable that the vapor-deposited metal film is formed on the vapor-deposited polymer film, because adhesion of the vapor-deposited metal film to the composite dielectric can be advantageously improved.

Figure 8:
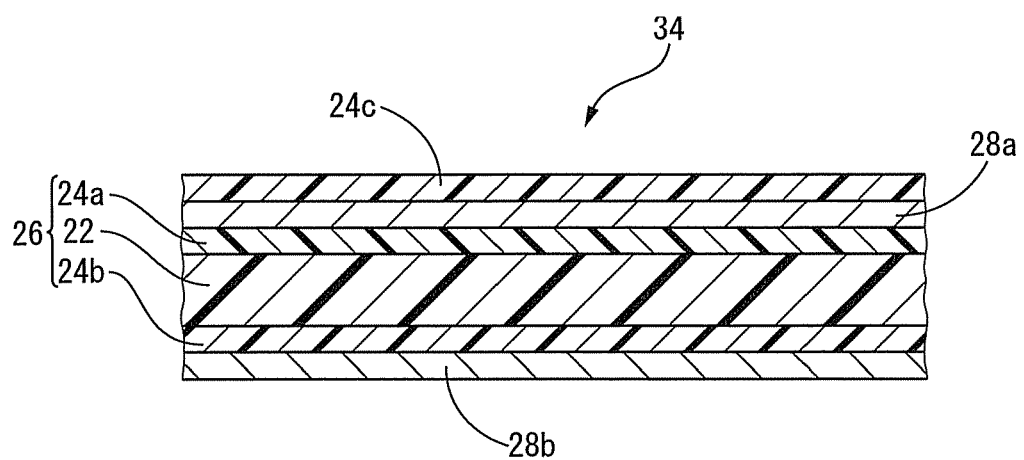
FIG. 8 is a view showing a further example of a multilayer film constituting a basic element, which is a component of a film capacitor having a structure according to the present invention, and corresponding to FIG. 1.

FIG. 8 shows another example of a multilayer film constituting a basic element, which is a component of a wound film capacitor, according to the present invention in a vertical cross section. As apparent from FIG. 8, the multilayer film (second basic element) 34 includes the composite dielectric 26 having the resin film 22 and the first and second vapor-deposited polymer films 24a, 24b formed on each surface of the resin film 22. The first vapor-deposited metal film 28a is formed on a surface of the first vapor-deposited polymer film 24a at the side opposite to the resin film 22 of the composite dielectric 26. The second vapor-deposited metal film 28b is formed on a surface of the second vapor-deposited polymer film 24b at the side opposite to the resin film 22. Every one of the resin film 22, the first and second vapor-deposited polymer films 24a, 24b, and the first and second vapor-deposited metal films 28a, 28b has the same structure made of the same material and has the same thickness as the stacked and wound film capacitors of the first and second embodiments.

In this embodiment, a third vapor-deposited polymer film 24c is formed on a surface of the first vapor-deposited metal film 28a at the side opposite to the first vapor-deposited polymer film 24a. Thus, the multilayer film 34 having a multilayer structure shown in FIG. 8 is obtained The third vapor-deposited polymer film 24c formed on the first vapor-deposited metal film 28a has the same structure as the first and second vapor-deposited polymer films 24a, 24b. Specifically, the third vapor-deposited polymer film 24c is made of a polyurea resin film formed according to a conventional vacuum deposition polymerization. Then, a plasma treatment is performed on a surface of the third vapor-deposited polymer film 24c. As a result, a three-dimensional cross-linked structure is introduced to the third vapor-deposited polymer film 24c, thereby effectively improving the withstand voltage and heat resistance thereof. The third vapor-deposited polymer film 24c is made to have a thickness of about 0.01 to 30 μm, for example, like the first vapor-deposited polymer film 16a of the multilayer film 10.

The third vapor-deposited polymer film 24c is not particularly limited to a polyurea resin film. Any resin film that can be formed by a known deposition polymerization may be employed. Examples of the resin films include polyamide resin film, polyimide resin film, polyamideimide resin film, polyester resin film, polyazomethine resin film, polyurethane resin film, and acrylic resin film. Among them, the polyurea resin film is favorably employed for the above-described reason. Further, other than the plasma treatment, a UV treatment and a thermal treatment may be suitably employed as a surface treatment method of the third vapor-deposited polymer film 24c, which is performed to improve the withstand voltage and the heat resistance.

Figure 9:
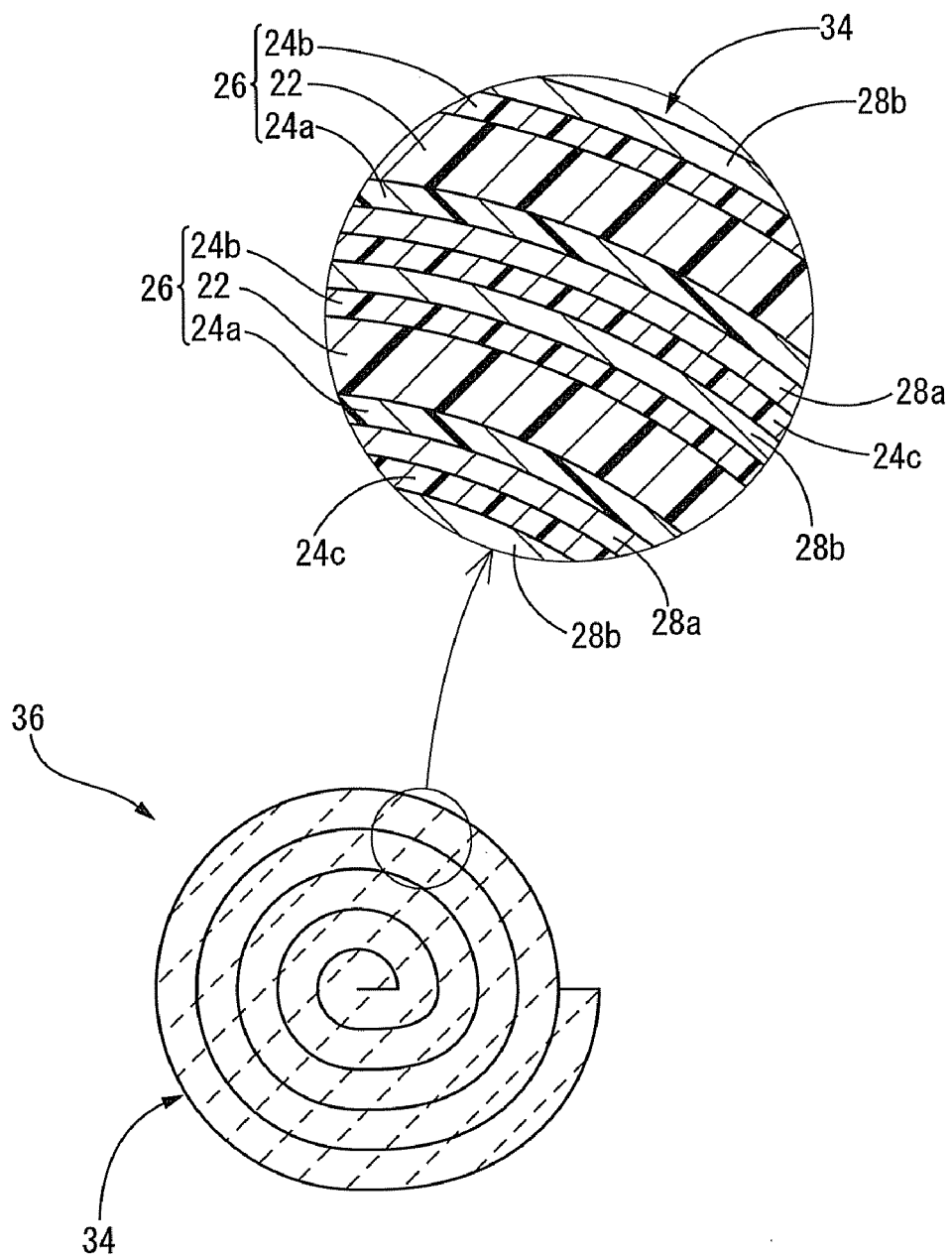
FIG. 9 is a cross sectional view showing a wound element formed by winding the multilayer film shown in FIG. 8.

Then, as shown in FIG. 9, a wound element 36 is formed by winding the multilayer film 34 a plurality of times such that the third vapor-deposited polymer film 24c is positioned innermost, or by winding the multilayer film 34 around a prescribed core (not shown) once or a plurality of times such that the third vapor-deposited polymer film 24c is positioned innermost, for example.

The composite dielectric 26 and the third vapor-deposited polymer film 24c of the wound element 36 are stacked such that either one of them is always positioned between the first and second vapor-deposited metal films 28a, 28b. Then, although not shown in the drawings, a protective film or the like which is used in the conventional film capacitor is wound over an outer circumferential surface of the wound element 36, external electrodes such as a pair of electrodes prepared by a metal spraying process, a predetermined terminal or the like is attached thereto, thereby obtaining the wound film capacitor.

In the production of the wound film capacitor of this embodiment, there are two ways to form the wound film capacitor. Specifically, as described above, the wound film capacitor may be obtained by winding one multilayer film 34, or winding two or more of the multilayer films 34 while the third vapor-deposited polymer film 24c and the second vapor-deposited metal film 28b are stacked with each other. In the latter way, one of the composite dielectric 26 and the third vapor-deposited polymer film 24c is always positioned between the vapor-deposited metal films 28a and 28b. The wound element 36 may also be formed by winding the multilayer film 34 shown in FIG. 8 and the multilayer film 10 shown in FIG. 1 while the second vapor-deposited metal film 28b of the former is stacked on the first vapor-deposited polymer film 16a of the latter.

Like the film capacitor shown in FIG. 6, the film capacitor of this embodiment obtained as above includes the composite dielectric 26 having the resin film 22, which has an adequately reduced thickness, and the first and second vapor-deposited polymer films 24a, 24b formed on respective surfaces of the resin film 22. Accordingly, the film capacitor of this embodiment can have the same advantages as the above-described film capacitor shown in FIG. 6.

As apparent from FIG. 9, the film capacitor of this embodiment realizes (achieves) the structure (A) and the structure (B) in the wound element 36 that is constituted by the roll of the multilayer film 34. Specifically, the structure (A) includes the composite dielectric 26 having the resin film 22 and the first and second vapor-deposited polymer films 24a, 24b formed on the resin film 22, and further includes the first vapor-deposited metal film 28a positioned radially inwardly of the composite dielectric 26 and the second vapor-deposited metal film 28b positioned radially outwardly of the composite dielectric 26, with the composite dielectric 26 therebetween. The structure (B) includes the third vapor-deposited polymer film 24c, the second vapor-deposited metal film 28b positioned radially inwardly of the third vapor-deposited polymer film 24c and the first vapor-deposited metal film 28a positioned radially outwardly of the third vapor-deposited polymer film 24c, with the third vapor-deposited polymer film 24c therebetween.

As described above, the film capacitor of this embodiment includes not only the structure (A), in which the dielectric having the resin film 22 and the first and second vapor-deposited polymer films 24a, 24b is positioned between the first vapor-deposited metal film 28a and the second vapor-deposited metal film 28b, but also the structure (B), in which the third vapor-deposited polymer film 24c having an extremely small and uniform thickness and extremely small amount of impurities in the film is positioned between the first vapor-deposited metal film 28a and the second vapor-deposited metal film 28b.

Thus, unlike the wound film capacitor having only the structure (A) in which the composite dielectric 26 is positioned between the first vapor-deposited metal film 28a and the second vapor-deposited metal film 28b, due to the presence of the structure (B), the film capacitor can have smaller size and increased capacitance without making the thickness of the resin film 22 extremely small and without reducing the amount of impurities in the material of the resin film 22.

Further, in the film capacitor of this embodiment, the thickness of the resin film 22 is not extremely reduced. Thus, reduction in withstand voltage of the resin film 22, eventually of the entire film capacitor, caused by the impurities inevitably present in the resin film, can be avoided. In addition, due to the presence of the first and second vapor-deposited polymer films 24a, 24b, the surface smoothness of the resin film 22 is improved, thereby effectively securing sufficient withstand voltage. Furthermore, in the continuous formation of the first and second vapor-deposited metal films 28a, 28b on each surface of the composite dielectric 26, deteriorations of the quality of the product that is caused by the extremely reduced thickness of the resin film 22 can be advantageously prevented. Examples of causes of the deteriorations include an occurrence of wrinkles on the resin film 22 by high-speed winding and deformation of the resin film 22 by contact of the metal atoms having high temperatures.

Consequently, the film capacitor of this embodiment can advantageously have a higher performance by reducing the size thereof and increasing the capacity thereof while securing sufficient withstand voltage, without improving the functionality of the resin film 22 by reducing the thickness of the resin film 22, without reducing the amount of impurities in the resin film 22, and without having a problem caused by the reduction in thickness of the resin film 22.

Figure 10:
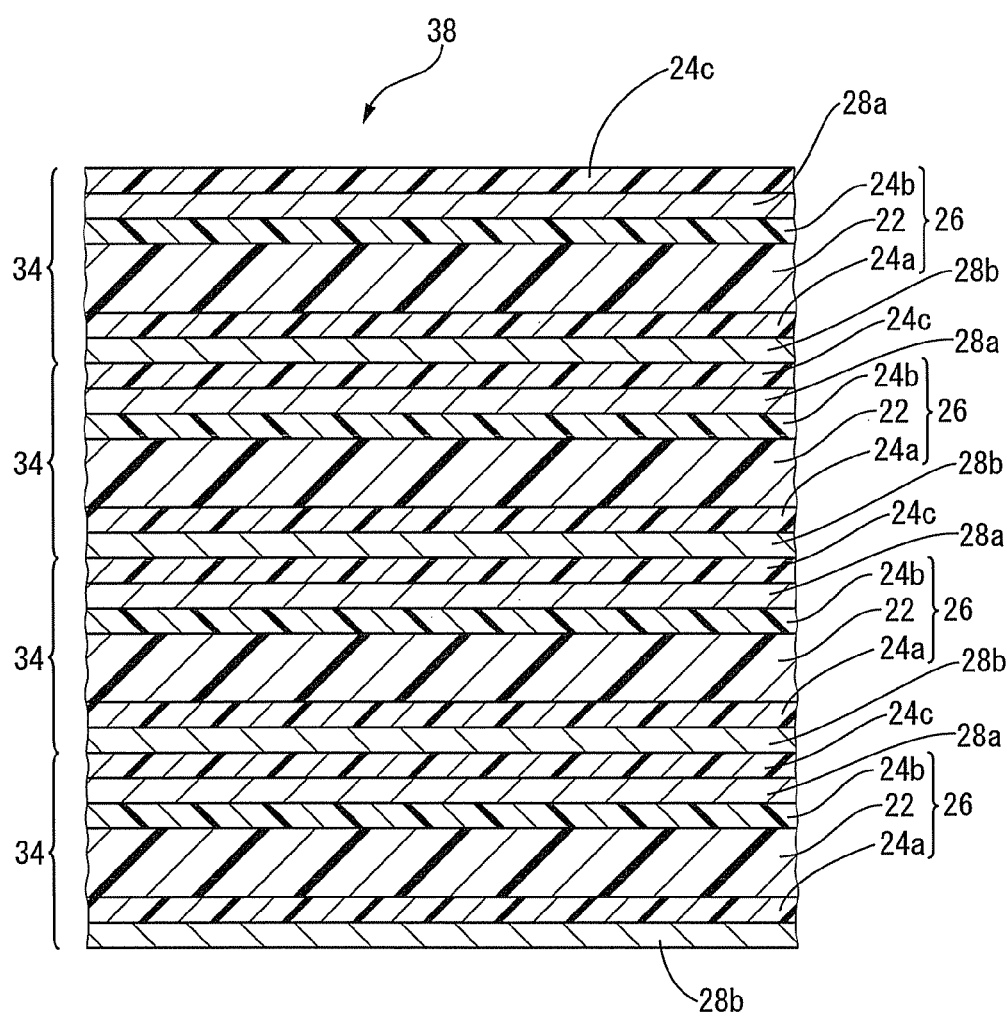
FIG. 10 is a partially enlarged cross sectional view showing a composite element formed of a plurality of multilayer films shown in FIG. 8.

When the multilayer film 34 having a structure shown in FIG. 8 is used, the composite element 38 is obtained by stacking a plurality of the multilayer films 34 (here, four) as shown in FIG. 10, for example. In the stacked composite element 38, on the third vapor-deposited polymer film 24c of one of two multilayer films 34, 34 to be stacked, the second vapor-deposited metal film 28b of the other multilayer film 34 is stacked. Thus, one of the dielectric 26 and the third vapor-deposited polymer film 24c is always positioned between the first and second vapor-deposited metal films 28a, 28b when the multilayer films 34 are stacked.

The stacked composite element 38 also includes the composite dielectric 26 having the resin film 22, which has an adequately reduced thickness, and the first and second vapor-deposited polymer films 24a, 24b formed on each surface of the resin film 22. Thus, the stacked film capacitor obtained by providing a protective film, external electrodes such as a pair of electrodes prepared by a metal spraying process, a predetermined terminal, or the like is attached to the composite element 38 can have substantially the same advantages as the film capacitors of the above-described embodiments.

The stacked composite element 38 also includes not only the structure (A), in which the composite dielectric 26 is positioned between the first vapor-deposited metal film 28a and the second vapor-deposited metal film 28b, but also the structure (B), in which the third vapor-deposited polymer film 24c having an extremely small and uniform thickness and extremely small amount of impurities in the film is positioned between the first vapor-deposited metal film 28a and the second vapor-deposited metal film 28b. Consequently, the stacked composite element 38 can advantageously have a higher performance by reducing the size thereof and increasing the capacity thereof, without improving the functionality of the resin film 22 by reducing the thickness of the resin film 22, without reducing the amount of impurities in the resin film 22, and without having a problem caused by the reduction in thickness of the resin film 22.

All of the above described wound and stacked film capacitors containing the multilayer film 34 includes the composite dielectric 26 that is constituted by forming the first vapor-deposited polymer film 24a and the second vapor-deposited polymer film 24b on respective surfaces of the resin film 22. The composite dielectric 26, however, may be obtained by forming the vapor-deposited polymer film (the first vapor-deposited polymer film 24a or the second vapor-deposited polymer film 24b) on only one surface of the resin film 22.

Further, the stacked film capacitor may be formed by stacking at least one multilayer film 21 shown in FIG. 5 and at least one multilayer film 34 shown in FIG. 8 with each other. In addition, the wound film capacitor may be formed by winding the at least one multilayer film 21 and the at least one multilayer film 34 while being stacked with each other. When such stacked or wound film capacitor is formed, the at least one multilayer film 21 and the at least one multilayer film 34 are stacked with each other such that one of the composite dielectric 26 and the third vapor-deposited polymer film 24c is positioned between the first and second vapor-deposited metal films 28a, 28b.

Figure 11:
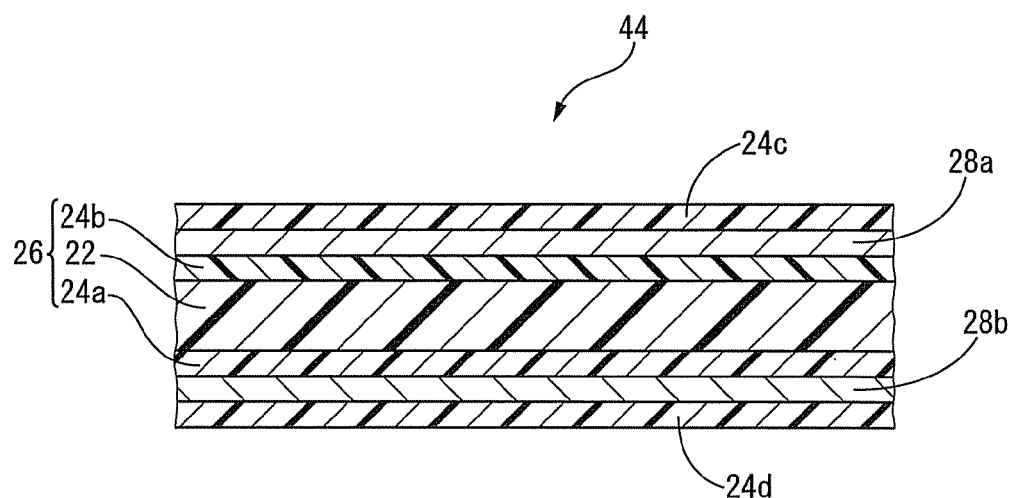
FIG. 11 is a view showing a still further example of a multilayer film constituting a basic element, which is a component of a film capacitor having a structure according to the present invention, and corresponding to FIG. 1.

As shown in FIG. 11, a multilayer film (fourth basic element) 44 may be constituted by forming a fourth vapor-deposited polymer film 24d by a vapor polymerization on a surface of the second vapor-deposited metal film 28b of the multilayer film 34 shown in FIG. 8 at the side opposite to the composite dielectric 26. It is also to be understood that, in the multilayer film 44, the third and fourth vapor-deposited polymer films 24c, 24d are not necessarily made of the same material and made to have the same thickness as the first and second vapor-deposited polymer films 24a, 24b.

Figure 12:
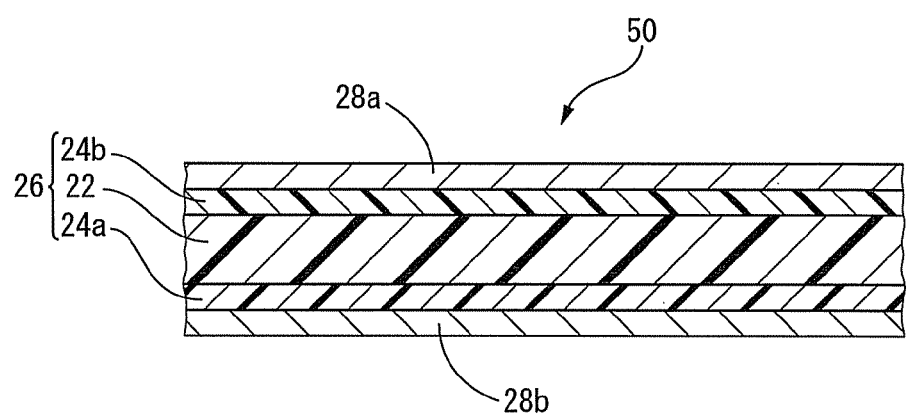
FIG. 12 is a view showing another example of a multilayer film constituting constituting a basic element, which is a component of a film capacitor having a structure according to the present invention, and corresponding to FIG. 1.

When the multilayer film 44 shown in FIG. 11 is used, a composite element or wound element, further a stacked or wound film capacitor can be formed by stacking at least one multilayer film (third basic element) 50 that includes the first vapor-deposited metal film 28a formed on one surface of the composite dielectric 26 and the second vapor-deposited metal film 28b formed on the other surface of the composite dielectric 26 as shown in FIG. 12, and the multilayer film 44 as shown in FIG. 11, with each other, or winding them while being stacked. Further, the multilayer film 44 shown in FIG. 11 and the multilayer film 19 shown in FIG. 3 may be stacked with each other or wound while being stacked with each other to form a composite element or wound element, and further to form a stacked film capacitor or a wound film capacitor. In this case, it is preferable that the thickness of each of the first and second vapor-deposited polymer films 16a, 16b of the multilayer film 19 and each of the third and fourth vapor-deposited polymer films 24c, 24d of the multilayer film 44 is about half the normal thickness thereof. In such film capacitor, at least any one of the first vapor-deposited polymer film 16a, the second vapor-deposited polymer film 16b, the third vapor-deposited polymer film 24c, the fourth vapor-deposited polymer film 24d, the resin film 22, and the composite dielectric 26 is positioned between the first vapor-deposited metal film 14a, 28a and the second vapor-deposited metal film 14b, 28b.

Although not shown in the drawings, the composite dielectric 26 and the multilayer film 50 shown in FIG. 12 may be stacked with each other or wound while being stacked with each other to form a composite element or wound element, and further to form a stacked film capacitor or wound film capacitor.

The multilayer film 50 shown in FIG. 12 may include the first vapor-deposited metal film 28a and the second vapor-deposited metal film 28b that are made of different metallic materials. The materials are determined depending on the required performance for the film capacitor, for example. In addition, the thickness and membrane resistance of each of the first vapor-deposited metal film 28a and the second vapor-deposited metal film 28b may be the same or different depending on the required performance or the like of the film capacitor.

Figure 13:
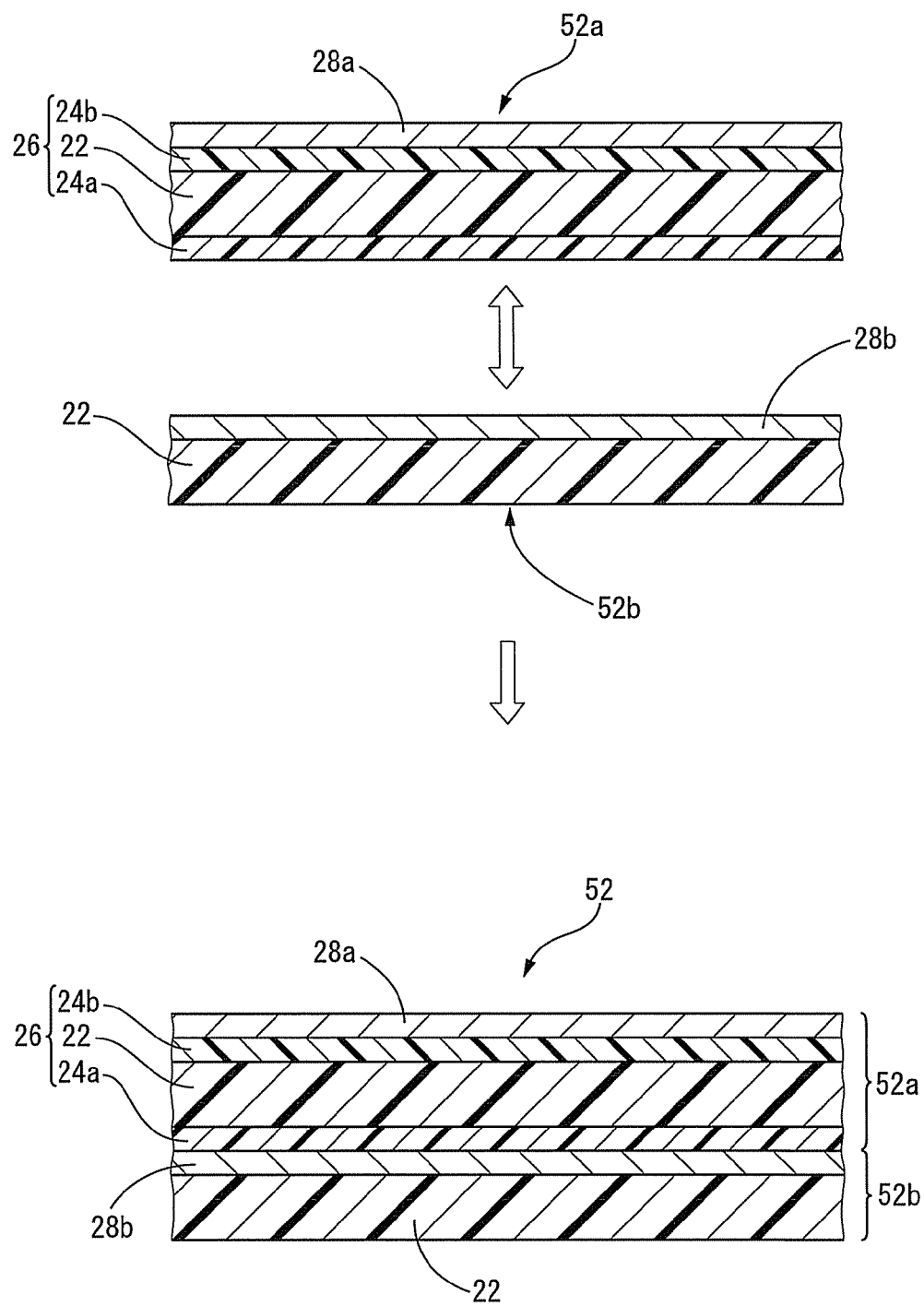
FIG. 13 is a view showing still another example of a multilayer film constituting a basic element, which is a component of a film capacitor having a structure according to the present invention, and corresponding to FIG. 1.

As shown in FIG. 13, a multilayer film 52 may be constituted by stacking a first multilayer film 52a that includes the composite dielectric 26 and the first vapor-deposited metal film 28a formed on the second vapor-deposited polymer film 24b of the composite dielectric 26, and a second multilayer film 52b that includes the resin film 22 and the second vapor-deposited metal film 28b formed on a surface of the resin film 22, with each other, such that the first vapor-deposited polymer film 24a of the first multilayer film 52a is stacked on the second vapor-deposited metal film 28b of the second multilayer film 52b. In other words, the first and second vapor-deposited metal films 28a, 28b are not necessarily integrally formed on the composite dielectric 26, as long as the first and second vapor-deposited metal films 28a, 28b are arranged so as to be positioned on both sides in the thickness direction of the composite dielectric 26.

When such multilayer film 52 is used, a plurality of multilayer films 52 are stacked on one another to form a composite element, further a stacked film capacitor. Further, one multilayer film 52 is wound or a plurality of multilayer films 52 are wound while being stacked to form a wound element, and further a wound film capacitor.

The film capacitor formed by using one of the above-described multilayer films 44, 50, and 52 includes the composite dielectric 26 that is constituted by the resin film 22 and at least one of the first vapor-deposited polymer film 24a and the second vapor-deposited polymer film 24b formed on the resin film 22. Accordingly, the film capacitor can have the same advantages as the above-described embodiments.

Figure 14:
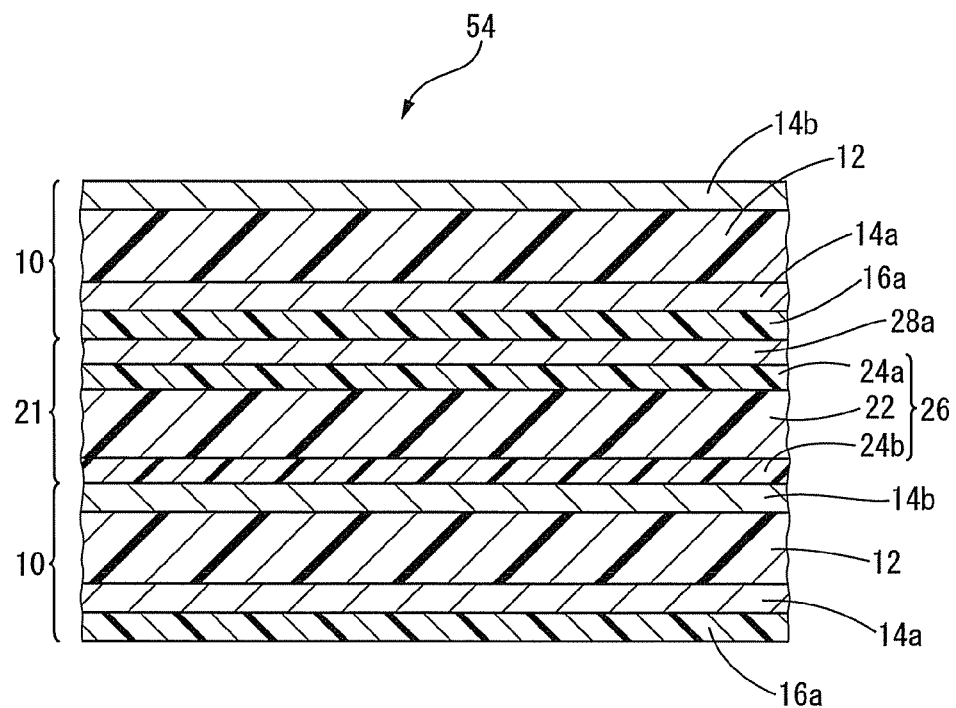
FIG. 14 is a partially enlarged view showing a composite element formed of the multilayer film shown in FIG. 1 and the multilayer film shown in FIG. 5, which are stacked with each other.

As shown in FIG. 14, some of the multilayer films 10 having a structure shown in FIG. 1 (here, two) and some of the multilayer films 21 having a structure shown in FIG. 5 (here, one) are stacked on one another to form a stacked composite element 54. The stacked composite element 54 has a section in which only the first vapor-deposited polymer film 16a is positioned between the first vapor-deposited metal films 14a and 28a, which are included in the adjacent multilayer films 10 and 21, respectively. Further, the multilayer film 21 positioned between two multilayer films 10, 10 includes the composite dielectric 26 in which the first vapor-deposited polymer film 24a and the second vapor-deposited polymer film 24b are formed on respective surfaces of the resin film 22, thereby forming the composite element 54.

As a result, in the stacked film capacitor including such a composite element 54, and in the wound film capacitor including the wound element obtained by winding a laminated structure body having the same structure as the composite element 54, both advantages that can be obtained by the film capacitor including the multilayer film 10 and that can be obtained by the film capacitor including the multilayer film 21 are advantageously obtained.

It is to be understood that, in the wound film capacitor, the number of winding is not particularly limited and, in the stacked film capacitor, the number of the multilayer films to be stacked is not particularly limited.

Figure 15:
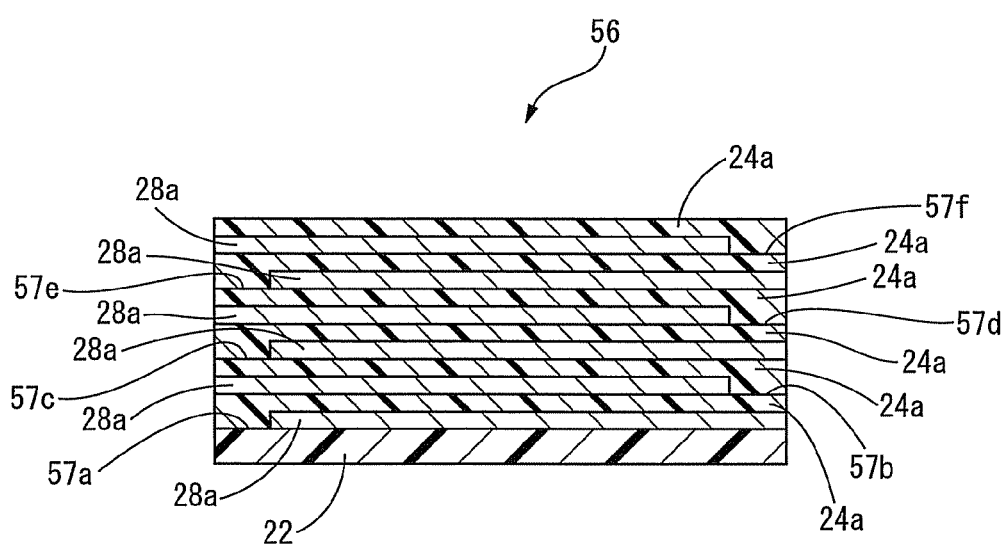
FIG. 15 is a cross sectional view showing another example of a multilayer film constituting a capacitor, which is a component of a film capacitor having a structure according to the present invention.

FIG. 15 shows another example of multilayer film constituting a basic element, which forms a film capacitor according to the present invention, in a vertical cross-sectional view. A multilayer film 56 shown in FIG. 15 includes one resin film 22 as a base and the first vapor-deposited metal film 28a formed on one surface of the resin film 22. On the other surface of the first vapor-deposited metal film 28a, which is not the side of the resin film 22, a plurality of first vapor-deposited polymer films 24a and a plurality of first vapor-deposited metal films 28a are formed so as to be arranged alternately in the order of the description. Every one of the resin film 22, the first vapor-deposited polymer film 24a and the first vapor-deposited metal film 28a has the same structure made of the same material and has the same thickness as that of the multilayer films 10, 21 according to the above-described first and second embodiments.

On one end portion of the resin film 22, there is a margin portion 57a on which the first vapor-deposited metal film 28a is not formed. Further, margin portions 57b, 57d, and 57f are, respectively, formed on the first, third and fifth of the first vapor-deposited polymer films 24a from the resin film 22 side, at the end opposite to the formation portion of the margin portion 57a of the resin film 22. Further, margin portions 57c and 57e are, respectively, formed on the second and fourth first-vapor deposited polymer film 24a at the same end as the formation portion of the margin portion 57a of the resin film 22. Although not shown in the drawings, some of the above-described stacked composite elements include the margin portions, on which no first vapor-deposited metal films 14a, 28a and no second vapor-deposited metal films 14b, 28b are formed, on ends of the resin films 12, 22, ends of the first vapor-deposited polymer films 16a, 24a and ends of the second vapor-deposited polymer films 16b, 24b.

Then, a composite element is constituted by using one multilayer film 56 as it is or by stacking a plurality of the multilayer films 56. Further, a wound element is constituted by winding one multilayer film 56 once or a plurality of times or by winding a laminated structure body, which is obtained by stacking a plurality of multilayer films 56 with each other, once or a plurality of times. Then, a protective film, external electrodes such as a pair of electrodes prepared by a metal spraying process, a predetermined terminal or the like is attached to the composite element or wound element, thereby obtaining the stacked or wound film capacitor. It is to be noted that, when the film capacitor includes only one multilayer film 56, the resin film 22 functions as a base and does not function as a dielectric.

In the film capacitor of this embodiment formed by using one or a plurality of multilayer film(s) 56, the thin first vapor-deposited polymer film 24a is respectively positioned between the adjacent first vapor-deposited metal films 28a, 28a. Further, the multilayer film 56 includes the resin film 22 as a base, and the dielectric is constituted by a plurality of thin first vapor-deposited polymer film 24a. As a result, in the film capacitor of this embodiment, the entire capacitor can be downsized and the capacitance thereof can be increased more effectively.

Figure 16:
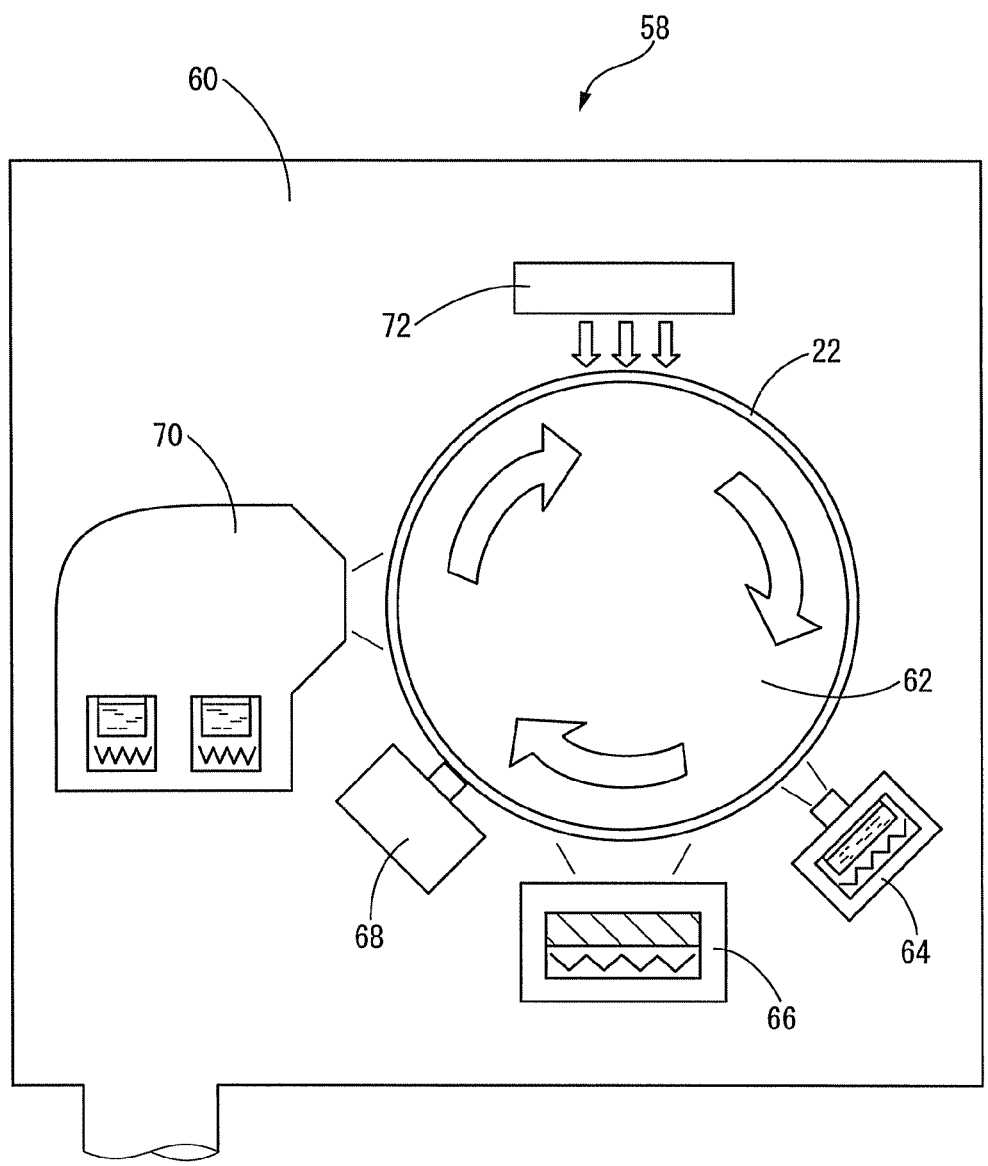
FIG. 16 is a view schematically showing an apparatus for producing a multilayer film shown in FIG. 15.

The multilayer film 56 that forms a film capacitor of this embodiment is produced by a multilayer film production apparatus 58 having a structure shown in FIG. 16, for example.

As apparent from FIG. 16, the multilayer film production apparatus 58 includes a vacuum chamber 60. The vacuum chamber 60 is made to be in a vacuum state by reducing the pressure of the internal space of the vacuum chamber 60 to a predetermined pressure by the operation of a vacuum, pump, which is not shown. In the vacuum chamber 60, a rotary drum 62 is disposed. The rotary drum 62 is continuously rotary driven in one direction (here, in a clockwise direction, which is a direction indicated by an outline arrow in FIG. 16) by a rotary driving device such as an electric motor, which is not shown. Further, the resin film 22 is wound over an outer circumferential of the rotary drum 62. Near the rotary drum 62 in the vacuum chamber 60, a margin portion formation device 64, a vapor-deposited metal film deposition device 66, an oil thin film removal device 68, a vapor-deposited polymer film deposition device 70, and a plasma treatment device 72 are arranged in the order of the description in a clockwise direction, with a distance therebetween in a circumferential direction of the rotary drum 62.

The margin portion formation device 64 forms an oil thin film on a portion of the first vapor-deposited polymer films 24a formed on the resin film 22, or on a portion of an outer circumferential surface of the resin film 22 wound over the rotary drum 62, by vapor-deposition or the like, thereby forming the margin portions 57a to 57f on the resin film 22 and the first vapor-deposited polymer films 24a. The margin portion formation device 64 is operated intermittently with a predetermined time interval, while the rotary drum 62 is rotated.

The vapor-deposited metal film deposition device 66 forms the first vapor-deposited metal films 28a on an outer circumferential surface of the resin film 22 wound over the rotary drum 62, by performing a vacuum deposition in which a vapor deposition material made of a predetermined metallic material is heated to be evaporated. To margin portions 57a to 57f, which are formed on the resin film 22 and the first vapor-deposited polymer films 24a by the margin portion formation device 64, metal atoms that are heated and evaporated by the vapor-deposited metal film formation device 66 are not adhered. Accordingly, the first vapor-deposited metal films 28a cannot be formed on the margin portions 57a to 57f.

The oil thin film removal device 68 removes the oil thin films constituting the margin portions 57a to 57f, which are formed on the resin film 22 and the first vapor-deposited polymer films 24a by the margin portion formation device 64. This oil thin film removal device 68 has a conventionally known structure.

The vapor-deposited polymer film deposition device 70 has a structure that heats and evaporates a plurality of kinds of raw material monomers. Then, polymerization reaction of the evaporated raw material monomers is caused on the outer circumferential of the resin film 22 wound over the rotary drum 62 and on the first vapor-deposited metal film 28a formed on the resin film 22, thereby forming the first vapor-deposited polymer film 24a on an outer circumferential surface of the resin film 22 and on the first vapor-deposited metal film 28a, respectively.

The plasma treatment device 72 has a conventionally known structure that generates plasma. The generated plasma is irradiated on a surface of the first vapor-deposited polymer film 24a formed on the resin film 22 or the first vapor-deposited metal film 28a, thereby subjecting the surface of the first vapor-deposited polymer film 24a to the plasma treatment. This plasma treatment device 72 also performs a plasma treatment, by irradiating plasma, on an outer circumferential surface of the resin film 22, on which the first vapor-deposited polymer film 28a and the first vapor-deposited polymer film 24a are not formed. By such plasma treatment of the surface of the first vapor-deposited polymer film 24a using the plasma treatment device 72, the withstand voltage and the heat resistance of the first vapor-deposited polymer film 24a can be improved. Further, the surface of the first vapor-deposited polymer film 24a is activated, thereby improving the adhesion of the first vapor-deposited polymer film 24a to the oil thin film and the first vapor-deposited metal film 28a. Further, by the plasma treatment of the outer circumferential surface of the resin film 22 using the plasma treatment device 72, the adhesion of the resin film 22 to the oil thin film and the first vapor-deposited metal film 28a can be improved.

When the multilayer film 56 is obtained by using the multilayer film production apparatus 58 having the above-described structure, the vacuum chamber 60 is made to be in a vacuum state after the resin film 22 is wound over the rotary drum 62. Meanwhile, the rotary drum 62 is rotated in a direction indicated by the outline arrow in FIG. 16.

When the vacuum chamber 60 becomes a predetermined vacuum state, the plasma treatment device 72 is operated while the rotary drum 62 is rotary driven. As a result, the outer circumferential surface of the resin film 22 wound over the rotary drum 62 is subjected to a plasma treatment, with the rotation of the rotary drum 62. Then, the margin portion formation device 64 is operated for a predetermined time when the start end of the plasma treated outer circumferential surface of the resin film 22 reaches a position corresponding to the position of the margin portion formation device 64. As a result, an oil thin film (not shown) is formed on a portion of the outer circumferential surface of the resin film 22 with a predetermined length in a circumferential direction. Then, the margin portion 57a is formed at the formation portion of the oil thin film on the outer circumferential surface of the resin film 22.

Then, when the margin portion 57a of the resin film 22 reaches a position corresponding to the position of the vapor-deposited metal film deposition device 66, an operation of the vapor-deposited metal film deposition device 66 is started. As a result, the first vapor-deposited metal film 28a is formed on the outer circumferential surface of the resin film 22. At this time, on the margin portion 57a formed on the outer circumferential surface of the resin film 22, the first vapor-deposited metal film 28a is not formed. Specifically, the first vapor-deposited metal film 28a is formed on the outer circumferential surface of the resin film 22 except for the formation portion of the margin portion 57.

Subsequently, when the margin portion 57a of the resin film 22 reaches a position corresponding to a position of the oil thin film removal device 68, by further rotation of the rotary drum 62, the oil thin film that is formed on the margin portion 57a is removed by the oil thin film removal device 68.

After that, when the margin portion 57a of the resin film 22, from which the oil thin film has been removed, reaches a position corresponding to the position of the vapor-deposited polymer film deposition device 70, an operation of the vapor-deposited polymer film deposition device 70 is started. As a result, the first vapor-deposited polymer film 24a is formed on the margin portion 57a of the resin film 22 and the first vapor-deposited metal film 28a.

As described above, during one rotation of the rotary drum 62, the first vapor-deposited metal film 28a is formed on the outer circumferential surface of the resin film 22 (one surface of the resin film 22 in a thickness direction), except for the margin portion 57a, and the vapor-deposited polymer film 24a is formed on the margin portion 57a of the resin film 22 and the first vapor-deposited metal film 28a (see, FIG. 15).

The vapor-deposited metal film deposition device 66, the vapor-deposited polymer film deposition device 70, and the plasma treatment device 72 are operated continuously until the production of the intended multilayer film 56 has been completed. Meanwhile, after the margin portion 57a of the resin film 22 reached the position of the margin portion formation device 64 and the rotary drum 62 entered the second rotation, the margin portion formation device 64 is operated for a predetermined time before the end of the fourth and sixth rotation and after the start of the third and fifth rotation of the rotary drum 62, respectively. By this operation, as shown in FIG. 15, the margin portions 57b to 57f are formed on one end or the other end of each of the first vapor-deposited polymer films 24a formed on the outer circumferential surface of the resin film 22. Further, the oil thin film removal device 68 is operated every time each of the margin portions 57b to 57f passes the oil thin film removal device 68, thereby removing the oil thin film formed on each of the margin portions 57b to 57f. Thus, the multilayer film 56 having a structure shown in FIG. 15 is produced.

In the production of the multilayer film 56 using the multilayer film production apparatus 58, during one rotation of the rotary drum 62, the above-described formation operations of the first vapor-deposited metal film 28a and the first vapor-deposited polymer film 24a may be performed while the margin portion 57a is formed on a plurality of portions of the outer circumferential surface of the resin film 22 wound over the rotary drum 62. As a result, on the rotary drum, a plurality of multilayer films 56 having a structure shown in FIG. 15 can be formed continuously in a circumferential direction of the rotary drum 62. In such case, the plurality of multilayer films 56 are separated to be used as separate composite elements.

Then, as shown in FIG. 17, an external electrode 74a (electrode prepared by a metal spraying process) is formed on one side of the multilayer film 56 where the margin portions 57a, 57c, 57e are formed, and an external electrode 74b (electrode prepared by a metal spraying process) is formed on the other side of the multilayer film 56 where the margin portions 57b, 57d, 57f are formed. Accordingly, of the plurality of the first vapor-deposited metal films 28a (here, six layers) formed on the resin film 22, the first, third, and fifth of the first vapor-deposited metal films 28a are contacted with an inner surface of the external electrode 74b at the end face positioned opposite to the side adjacent to the margin portions 57a, 57c, 58e, to be in a conduction state only against the external electrode 74b. On the other hand, the second, fourth, and sixth of the first vapor-deposited metal film 28a are contacted with an inner surface of the external electrode 74a at the end face positioned opposite to the side adjacent to the margin portions 57b, 57d, 57f, to be in a conduction state only against the external electrode 74a. One of the external electrodes 74a, 74b is made as a positive electrode, and the other is made as a negative electrode. Further, on the surface of multilayer film 56 except for the formation portion of the external electrodes 74a, 74b, a protective film or the like may be provided as necessary. Accordingly, the stacked film capacitor 76 can be obtained.

Preferably, the external electrodes 74a, 74b are formed by a thermal spraying using the same metallic material as the first vapor-deposited metal film 28a, for example. This enhances the adhesion between the external electrodes 74a, 74b and the first vapor-deposited metal films 28a. Further, herein, the dielectric included in the multilayer film 56 consists of the first vapor-deposited polymer film 24a and the second vapor-deposited polymer film 24b that has a functional group (—OH group or C=O group, for example). As a result, the adhesion between the first and second vapor-deposited polymer films 24a, 24b and the external electrodes 74a, 74b formed by a thermal spraying is effectively improved based on hydrogen bonding or Van der Waals force. Consequently, it can be advantageously prevented that the external electrodes 74a, 74b are separated from the multilayer film 56.

Figure 18:
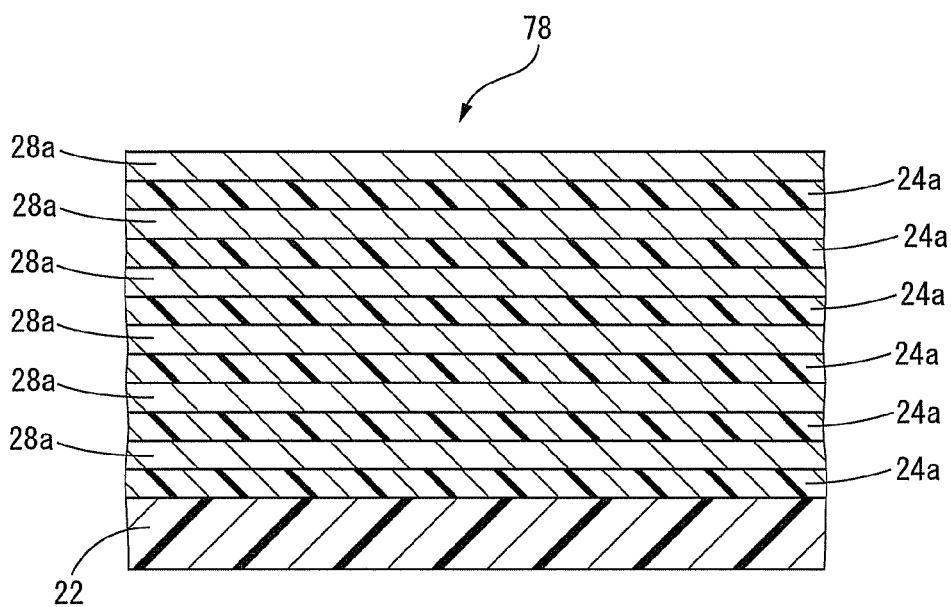
FIG. 18 is a view showing another example of a multilayer film constituting a basic element, which is a component of a film capacitor having a structure according to the present invention, and corresponding to FIG. 1.
Figure 19:
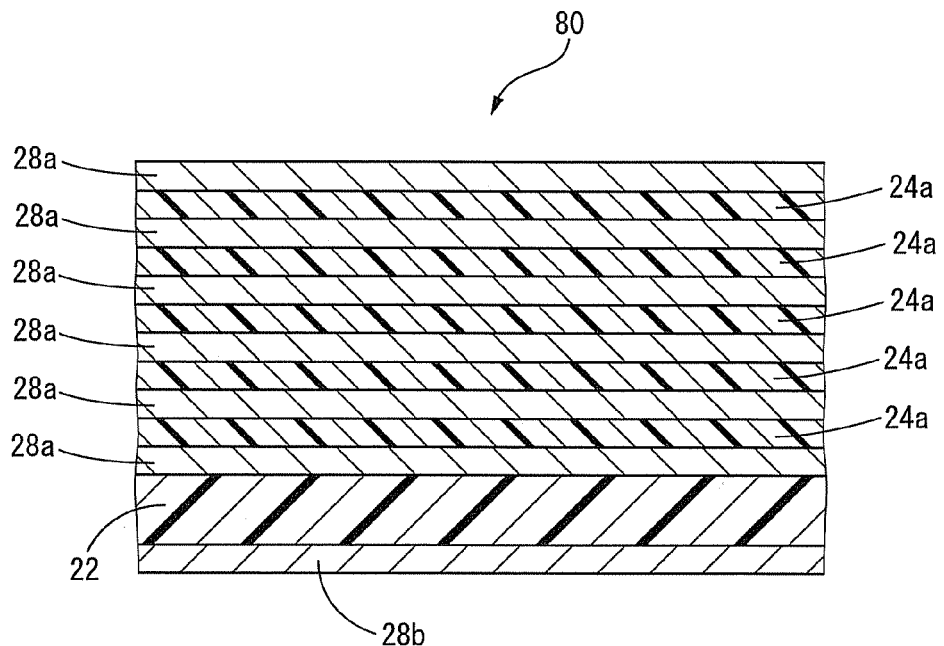
FIG. 19 is a view showing a further example of a multilayer film constituting a basic element, which is a component of a film capacitor having a structure according to the present invention, and corresponding to FIG. 1.
Figure 20:
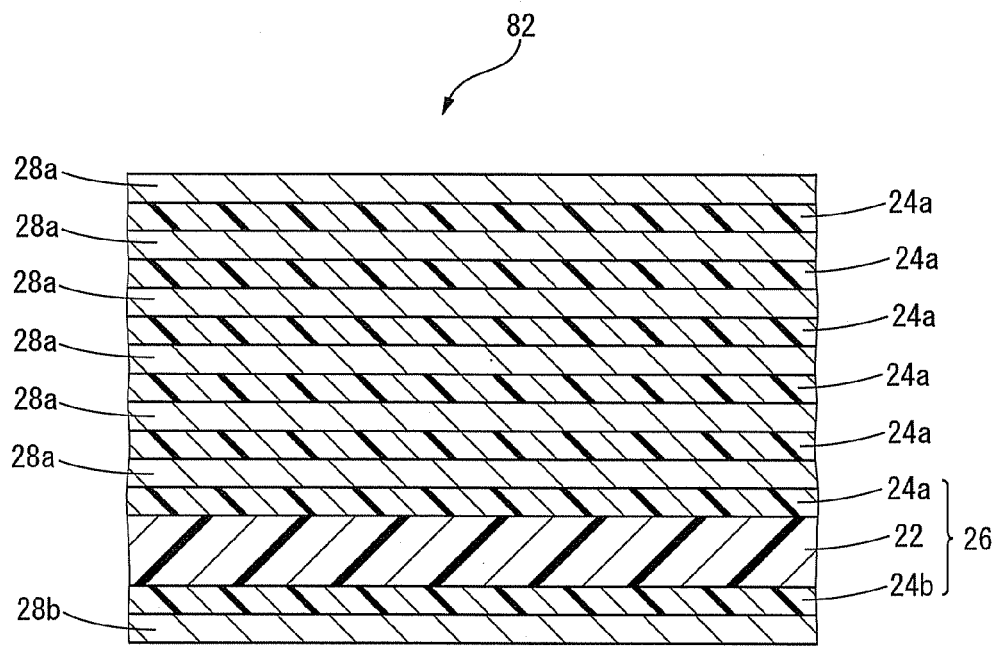
FIG. 20 is a view showing a still further example of a multilayer film constituting a basic element, which is a component of a film capacitor having a structure according to the present invention, and corresponding to FIG. 1.

FIGS. 18 to 20 show some other examples of the multilayer film constituting a basic element, which forms a film capacitor according to the present invention, in vertical cross sectional views. The multilayer film 78 shown in FIG. 18 includes one resin film 22 as a base, and the first vapor-deposited polymer film 24a is formed on one surface of the resin film 22. Further, the first vapor-deposited metal films 28a and the first vapor-deposited polymer films 24a are alternately formed in the order of the description on the surface of the first vapor-deposited polymer film 24a at the side opposite to the resin film 22.

The multilayer film 78 can also be produced by using the multilayer film production apparatus 58 shown in FIG. 16. In such a production, at the first rotation of the rotary drum 62, the first vapor-deposited polymer film 24a is formed on an outer circumferential surface of the resin film 22 by the vapor-deposited polymer film deposition device 70, for example. Then, from the second rotation of the rotary drum 62, the same process as the process for forming the first vapor-deposited metal films 28a and the first vapor-deposited polymer films 24a alternately is operated on the resin film 22 of the multilayer film 78. Thus, the multilayer film 78 having a structure shown in FIG. 18 is produced. Although not shown in the drawings, similar to the multilayer film 56 shown in FIG. 15, the margin portion is formed on one end or the other end of each of the first vapor-deposited polymer films 24a. Further, every one of the resin film 22, the first vapor-deposited polymer films 24a and the first vapor-deposited metal films 28a has the same structure made of the same material and has the same thickness as the multilayer films 10 and 21 of the first and second embodiments.

A composite element is constituted by using one multilayer film 78 as it is or by stacking a plurality of the multilayer films 78. Further, a wound element is constituted by winding the multilayer film 78 once or a plurality of times or winding a laminated structure body, which is obtained by stacking the plurality of multilayer films 78 with each other, once or a plurality of times. Then, a protective film, external electrodes such as a pair of electrodes prepared by a metal spraying process, a predetermined terminal, or the like is attached to the composite element or wound element, thereby obtaining the stacked or wound film capacitor. It is to be noted that, when the film capacitor includes only one multilayer film 78, the resin film 22 functions as a base and does not function as a dielectric.

As described above, in the film capacitor of this embodiment formed by using one or a plurality of multilayer film(s) 78, the thin first vapor-deposited polymer films 24a are each positioned between the adjacent first vapor-deposited metal films 28a, 28a. Further, one multilayer film 78 includes one resin film 22 as a base, and the dielectric is constituted by a plurality of thin first vapor-deposited polymer films 24a. As a result, in the film capacitor of this embodiment, the entire capacitor can be downsized and the capacitance thereof can be increased more effectively.

Further, in the film capacitor formed by using a composite element obtained by stacking a plurality of multilayer films 78 such that the resin film 22 of one multilayer film 78 is stacked on the first vapor-deposited metal film 28a of another multilayer film 78, which is positioned on the top layer opposite to the resin film 22 side, the resin film 22 having the first vapor-deposited polymer film 24a formed on one surface thereof is positioned between the adjacent first vapor-deposited metal films 28a, 28a. Further, similarly to this composite element, in the film capacitor formed by using a wound element formed by winding a laminated structure body obtained by stacking a plurality of multilayer films 78, the resin film 22 having the first vapor-deposited polymer film 24a formed on one surface of the resin film 22 is positioned between the adjacent first vapor-deposited metal films 28a, 28a. Accordingly, not only the size of the entire capacitor can be reduced and the capacitance thereof can be increased, but also sufficient withstand voltage can be effectively secured.

A multilayer film 80 shown in FIG. 19 includes one resin film 22 as a base, and the first vapor-deposited metal film 28a and the second vapor-deposited metal film 28b are formed on respective surfaces of the resin film 22. Further, the first vapor-deposited polymer films 24a and the first vapor-deposited metal films 28a are alternately formed, in the order of the description, on the surface of the first vapor-deposited metal film 28a at the side opposite to the resin film 22.

The multilayer film 80 can be produced by a production apparatus having a structure slightly different from the structure of the multilayer film production apparatus 58 shown in FIG. 16. Specifically, the production apparatus includes another rotary drum disposed in the vacuum chamber 60, in addition to the rotary drum 62, and another vapor-deposited metal film deposition device disposed around the another rotary drum, in addition to the vapor-deposited metal film deposition device 66, for example. Then, the resin film 22 is wound over the another rotary drum to form the second vapor-deposited metal film 28b on one surface of the resin film 22 by the another vapor-deposited metal film deposition device. Subsequently, the resin film 22 on which the second vapor-deposited metal film 28b is formed is wound over the rotary drum 62 such that the second vapor-deposited metal film 28b positioned inner side. Then, the same production process as the above-described production process of the multilayer film 56 is operated. Thus, the multilayer film 80 having a structure shown in FIG. 19 is produced. Although not shown in the drawings, in this multilayer film 80, similar to the multilayer film 56 shown in FIG. 15, margin portions are formed on one end of the resin film 22 and one end or the other end of each of the first vapor-deposited polymer films 24a. Every one of the resin film 22, the first vapor-deposited polymer film 24a and the first and second vapor-deposited metal films 28a, 28b, which are included in the multilayer film 80, has the same structure made of the same material and has the same thickness as the multilayer films 10, 21 and 34 of the above-described embodiments.

A composite element is constituted by using one multilayer film 80 as it is or by stacking a plurality of multilayer films 80. Further, a wound element is constituted by winding the multilayer film 80 once or a plurality of times or winding a laminated structure body, which is obtained by stacking a plurality of multilayer films 80 with each other, once or a plurality of times. Then, a protective film, external electrodes, a predetermined terminal, or the like is attached to the composite element or wound element, thereby obtaining the stacked or wound film capacitor.

In the film capacitor of this embodiment formed by using such multilayer film 80, the thin first vapor-deposited polymer film 24a are respectively positioned between the adjacent first vapor-deposited metal films 28a, 28a. Further, one multilayer film 80 includes one resin film 22. Accordingly, in the film capacitor according to this embodiment, the entire capacitor can be downsized and the capacitance thereof can be effectively increased. In this embodiment, the resin film 22 is positioned between the adjacent first vapor-deposited metal films 28*a*, 28*b*. Thus, the resin film 22 advantageously functions as a dielectric.

A multilayer film 82 shown in FIG. 20 includes one resin film 22 as a base, and the first vapor-deposited polymer film 24*a* and the second vapor-deposited polymer film 24*b* are formed on respective surfaces of the resin film 22. Further, the first vapor-deposited metal film 28*a* and the second vapor-deposited metal film 28*b* are respectively formed on the surface of the first vapor-deposited polymer film 24*a* and the surface of the second vapor-deposited polymer film 24*b* at the side opposite to the resin film 22. Furthermore, on the surface of the first vapor deposited metal film 28*a*, the first vapor-deposited polymer film 24*a* and the first vapor-deposited metal film 28*a* are alternately formed, in the order of the description, at the side opposite to the resin film 22 side.

The multilayer film 82 can be produced by a production apparatus having a structure slightly different from the structure of the multilayer film production apparatus 58 shown in FIG. 16. Specifically, the production apparatus includes another rotary drum disposed in the vacuum chamber 60, in addition to the rotary drum 62, and another vapor-deposited metal film deposition device and another vapor-deposited polymer film deposition device, which are disposed around the another rotary drum, in addition to the vapor-deposited metal film deposition device 66 and the vapor-deposited polymer film deposition device 70, for example. Then, the resin film 22 is wound over the another rotary drum to form the second vapor-deposited polymer film 24*b* and the second vapor-deposited metal film 28*b* on one surface of the resin film 22 by the another vapor-deposited polymer film deposition device and the another vapor-deposited metal film deposition device. Subsequently, the resin film 22 is wound over the rotary drum 62 such that the side on which the second vapor-deposited polymer film 24*b* and the second vapor-deposited metal film 28*b* are formed is positioned inner side. Then, the same production process as the above-described production process of the multilayer film 78 is operated. Thus, the multilayer film 82 having the structure shown in FIG. 20 is produced. Although not shown in the drawings, in this multilayer film 82, similar to the multilayer film 56 shown in FIG. 15, margin portions are formed on one end or the other end of each of the first vapor-deposited polymer films 24*a*. Every one of the resin film 22, the first and second vapor-deposited polymer films 24*a*, 24*b* and the first and second vapor-deposited metal films 28*a*, 28*b*, which are included in the multilayer film 82, has the same structure made of the same material and has the same thickness as the multilayer films 10, 21 and 34 of the above-described embodiments.

Then, in the same manner as the case in which the multilayer film 80 is used to obtain a film capacitor, one multilayer film 82 or a plurality of multilayer films is/are used to form a stacked or wound film capacitor.

In the film capacitor of this embodiment formed by using such a multilayer film 82, the thin first vapor-deposited polymer films 24*a* are respectively positioned between the adjacent first vapor-deposited metal films 28*a*, 28*a*. Further, one multilayer film 82 includes only one resin, film 22. As a result, in the film capacitor of this embodiment, the entire capacitor can be downsized and the capacitance thereof can be effectively increased.

Further, in the film capacitor of this embodiment, the composite electrode 26 in which the first vapor-deposited polymer film 24*a* and the second vapor-deposited polymer film 24*b* are formed on respective surfaces of the resin film 22 is positioned between the first vapor-deposited metal film 28*a* and the second vapor-deposited metal film 28*b*. As a result, in the film capacitor of this embodiment, in addition to the realization of downsize of the entire capacitor and increase of the capacity thereof, sufficient withstand voltage can be effectively secured.

While the specific embodiment of the present invention has been described in detail, for illustrative purpose only, it is to be understood that the present invention is not limited to the details of the illustrated embodiments. Although further details will not be described herein, it is to be understood that the present invention may be embodied with various other changes and modifications which may occur to those skilled in the art, without departing from the spirit and scope of the invention.

What is claimed is:

1. A film capacitor comprising at least one basic element containing a plurality of dielectric layers and at least one vapor-deposited metal film layer,
   wherein the plurality of dielectric layers consisting of a resin film layer and at least one vapor-deposited polymer film layer, and
   the at least one vapor-deposited polymer film layer is formed on at least one of the resin film layer and the at least one vapor-deposited metal film layer.

2. The film capacitor according to claim 1, wherein the basic element is obtained by forming the at least one vapor-deposited metal film layer on each surface of the resin film layer and further forming the at least one vapor-deposited polymer film layer on at least one of the vapor-deposited metal film layers.

3. The film capacitor according to claim 2, wherein a wound element that is obtained by winding the basic element is used to constitute the film capacitor.

4. The film capacitor according to claim 1, wherein the at least one basic element comprises a plurality of basic elements, and the plurality of basic elements are stacked with each other such that a section in which only the resin film layer is positioned between the vapor-deposited metal films and a section in which only the at least one vapor-deposited polymer film is positioned between the vapor-deposited metal films are formed, thereby obtaining a composite element that constitutes the film capacitor.

5. The film capacitor according to claim 1, wherein the vapor-deposited polymer film layer has a thickness in a range of from 0.01 to 30 μm.

6. The film capacitor according to claim 1, wherein the basic element is obtained by forming the at least one vapor-deposited polymer film layer on at least one surface of the resin film layer, and further forming the at least one vapor-deposited metal film layer on at least one of the at least one vapor-deposited polymer film layer.

7. The film capacitor according to claim 6, wherein the vapor-deposited polymer film layer has a thickness in a range of from 0.001 to 10 μm.

8. The film capacitor according to claim 6, wherein the basic element is obtained by forming the at least one vapor-deposited polymer film layer on each surface of the resin film layer, and forming the at least one vapor-deposited metal film layer on each of the vapor-deposited polymer film layers, and further forming one of another vapor-deposited polymer film layer and another resin film layer as a dielectric layer, on at least one of the vapor-deposited metal film layers.

9. The film capacitor according to claim 8, wherein a wound element that is obtained by winding the basic element is used to constitute the film capacitor.

10. The film capacitor according to claim 6, comprising a composite element, wherein the basic element comprises a plurality of basic elements, and the composite element is obtained by stacking the plurality of basic elements such that at least one of the dielectric layers is positioned between the vapor-deposited metal film layers of the adjacent basic elements.

11. The film capacitor according to claim 1, wherein the vapor-deposited polymer film layer is formed of a polyurea resin film.

12. The film capacitor according to claim 1, wherein the vapor-deposited polymer film layer has a three-dimensional cross-linked structure.

13. The film capacitor according to claim 1, wherein a dielectric constant of the at least one vapor-deposited polymer film layer is higher than that of the resin film layer.

14. The film capacitor according to claim 1, wherein at least one vapor-deposited polymer film layer comprises a plurality of vapor-deposited polymer film layers and the at least one vapor-deposited metal film layer comprises a plurality of vapor-deposited metal film layers, and the at least one basic element has a structure in which the plurality of vapor-deposited polymer film layers and the plurality of vapor-deposited metal film layers are alternately formed on the resin film layer.

15. A method of producing a film capacitor comprising the steps of:
providing at least one basic element according to claim 1;
obtaining one of a composite element and a wound element, the composite element obtained by stacking a plurality of basic elements and the wound element obtained by winding the at least one basic element; and
producing the film capacitor by using one of the composite element and the wound element.

* * * * *